US011379025B2

(12) United States Patent
Lee et al.

(10) Patent No.: US 11,379,025 B2
(45) Date of Patent: Jul. 5, 2022

(54) ELECTRONIC DEVICE FOR PERFORMING POWER MANAGEMENT AND METHOD FOR OPERATING THE SAME

(71) Applicant: SAMSUNG ELECTRONICS CO., LTD., Suwon-si (KR)

(72) Inventors: Chongmin Lee, Suwon-si (KR); Sungku Yeo, Suwon-si (KR); Jaeseok Park, Suwon-si (KR); Hyoseok Han, Suwon-si (KR); Jaesun Shin, Suwon-si (KR); Jeongman Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 16/847,176

(22) Filed: Apr. 13, 2020

(65) Prior Publication Data

US 2020/0363850 A1 Nov. 19, 2020

Related U.S. Application Data

(60) Provisional application No. 62/848,769, filed on May 16, 2019.

(30) Foreign Application Priority Data

Sep. 16, 2019 (KR) .......................... 10-2019-0113674
Sep. 25, 2019 (KR) .......................... 10-2019-0117919

(51) Int. Cl.
*G06F 1/26* (2006.01)
*G05F 1/66* (2006.01)

(52) U.S. Cl.
CPC . *G06F 1/26* (2013.01); *G05F 1/66* (2013.01)

(58) Field of Classification Search
CPC ...................................... G06F 1/26; G05F 1/66
(Continued)

(56) References Cited

U.S. PATENT DOCUMENTS

2002/0167827 A1 11/2002 Umeda et al.
2010/0219687 A1  9/2010 Oh
(Continued)

FOREIGN PATENT DOCUMENTS

EP        2226699 A2    9/2010
KR  10-2007-0101493 A  10/2007
(Continued)

OTHER PUBLICATIONS

International Search Report dated Jul. 16, 2020 issued by the International Searching Authority in counterpart International Application No. PCT/KR2020/004834 (PCT/ISA/210).
(Continued)

*Primary Examiner* — Robert A Cassity
(74) *Attorney, Agent, or Firm* — Sughrue Mion, PLLC

(57) ABSTRACT

An electronic device includes a plurality of loads, at least one processor, a plurality of regulators configured to adjust a voltage of power received from a power source and output the adjusted power, and a switching circuit configured to connect at least one of the plurality of regulators to at least one of the plurality of loads. The at least one processor is configured to identify a load to which power is to be supplied among the plurality of loads, select at least one regulator among the plurality of regulators connectable to the identified load, and control the switching circuit to connect the at least one selected regulator to the identified load.

18 Claims, 36 Drawing Sheets

(58) Field of Classification Search
USPC .......................................................... 713/300
See application file for complete search history.

(56) References Cited

U.S. PATENT DOCUMENTS

| | | | |
|---|---|---|---|
| 2011/0031958 A1* | 2/2011 | Wang | H02M 3/157 324/120 |
| 2013/0093251 A1* | 4/2013 | Kondo | H02M 3/1584 307/82 |
| 2013/0193755 A1* | 8/2013 | Chang | H02M 3/1584 307/18 |
| 2014/0149764 A1 | 5/2014 | Gunther et al. | |
| 2015/0357815 A1* | 12/2015 | Luh | H02J 3/00 307/31 |
| 2015/0364982 A1 | 12/2015 | Chae et al. | |
| 2015/0381026 A1 | 12/2015 | Tournatory | |
| 2016/0022201 A1 | 1/2016 | Arnold et al. | |
| 2016/0070335 A1* | 3/2016 | Mitrea | G06F 1/3243 713/323 |
| 2016/0111958 A1 | 4/2016 | Choi et al. | |
| 2016/0179117 A1 | 6/2016 | Eastep et al. | |
| 2017/0031430 A1 | 2/2017 | Ansorregui et al. | |
| 2017/0220100 A1* | 8/2017 | DiBene, II | G06F 1/3237 |
| 2017/0248996 A1* | 8/2017 | Zhang | H02M 3/1584 |
| 2018/0235046 A1 | 8/2018 | Muyshondt | |
| 2019/0103801 A1* | 4/2019 | Venkataraman | H02M 3/158 |
| 2019/0199217 A1* | 6/2019 | G | H02M 1/14 |
| 2019/0214906 A1* | 7/2019 | Mahmoudi | H02M 3/18 |

FOREIGN PATENT DOCUMENTS

| | | |
|---|---|---|
| KR | 10-2013-0035490 A | 4/2013 |
| KR | 10-2015-0142743 A | 12/2015 |
| KR | 10-2017-0015097 A | 2/2017 |

OTHER PUBLICATIONS

International Written Opinion dated Jul. 16, 2020 issued by the International Searching Authority in counterpart International Application No. PCT/KR2020/004834 (PCT/ISA/237).

Communication dated Apr. 19, 2022 issued by the European Patent Office in application No. 20806214.1.

* cited by examiner

ELECTRONIC DEVICE FOR PERFORMING POWER MANAGEMENT AND METHOD FOR OPERATING THE SAME

CROSS-REFERENCE TO RELATED APPLICATION(S)

This application is based on and claims benefit of U.S. Provisional Patent Application No. 62/848,769, filed on May 16, 2019, in the United States Patent and Trademark Office, and also is based on and claims priority under 35 U.S.C. § 119 to Korean Patent Application No. 10-2019-0113674, filed on Sep. 16, 2019, in the Korean Intellectual Property Office, and Korean Patent Application No. 10-2019-0117919, filed on Sep. 25, 2019, in the Korean Intellectual Property Office. The disclosures of the above-listed applications are incorporated by reference herein in their entireties.

BACKGROUND

1. Field

The disclosure relates to electronic devices performing power management and methods of operating the same.

2. Description of Related Art

Various kinds of movable electronic devices (e.g., robots) are widely used. These electronic devices include wheels, two legs, flying propellers, or other various moving means to move from one position to another. Upon detecting an occurrence of specific event, an electronic device may move to the point corresponding to the detected event. For example, upon receiving a message for transferring to a specific user, an electronic device may move near the specific user and provide the user with the message in a visual or audible manner. When recognizing a user's call, the electronic device may move near the user and output a voice.

An electronic device may perform various operations, e.g., such as obtaining ambient information, receiving communication signals via a communication network, analyzing data, outputting information, and moving to another point, and may include a plurality of loads for performing such operations. The electronic device may include regulators for regulating power to the plurality of loads.

Related art electronic devices include a plurality of regulators each corresponding to a respective one of a plurality of loads. If the power management integrated circuit (PMIC) of the electronic device provides a plurality of voltages (e.g., 5V and 2.7V), the plurality of loads may obtain and use their required voltages. If a specific load is determined to be driven, the regulator corresponding to the specific load regulates received power and transfers the regulated power to the determined load. The regulators may have different efficiencies depending on operation conditions (e.g., the magnitude of input current or the magnitude of output current). If the magnitude of current of power provided to the specific load is varied, the regulator may fail to operate in its optimal efficiency. The connections between the plurality of regulators and the plurality of loads are fixed and not reconfigurable.

The above information is presented as background information only to assist with an understanding of the disclosure. No determination has been made, and no assertion is made, as to whether any of the above might be applicable as prior art with regard to the disclosure.

SUMMARY

According to embodiments of the disclosure, an electronic device may include a switching circuit capable of selectively connecting at least one of a plurality of regulators to at least one of a plurality of loads but rather than connecting each of the plurality of regulators to a respective corresponding one of the plurality of loads in a one-to-one correspondence manner, an electronic device and method of operating the electronic device may selectively connect each regulator and each load so that the regulator driven may be operated under the optimal operation condition.

In accordance with an aspect of the disclosure, an electronic device includes a plurality of loads, at least one processor, a plurality of regulators configured to adjust a voltage of power received from a power source and output the voltage-adjusted power, and a switching circuit connecting at least one of the plurality of regulators to at least one of the plurality of loads, wherein the at least one processor is configured to identify a load to which power is to be supplied among the plurality of loads, select at least one regulator among the plurality of regulators connectable to the identified load, and control the switching circuit to connect the at least one selected regulator to the identified load.

In accordance with an aspect of the disclosure, a power management circuit configured to transfer power to at least one of a plurality of external loads includes a microcontrolling unit (MCU), a plurality of regulators configured to adjust a voltage of power received from a power source and output the voltage-adjusted power, and a switching circuit selectively connecting at least one of the plurality of regulators to at least one of the plurality of loads, wherein the MCU is configured to identify a load to which power is to be supplied among the plurality of loads, select at least one regulator among the plurality of regulators connectable to the identified load, and control the switching circuit to connect the at least one selected regulator to the identified load.

In accordance with an aspect of the disclosure, an electronic device includes a plurality of loads, at least one processor, a plurality of regulators configured to adjust a voltage of power from a power source and output the adjusted power, and a switching circuit selectively connecting at least one of the plurality of regulators to at least one of the plurality of loads, wherein the at least one processor is configured to control the switching circuit to form a first connection between at least one first regulator corresponding to first state information among the plurality of regulators and at least one first load corresponding to the first state information among the plurality of loads based on obtaining the first state information and control the switching circuit to form a second connection between at least one second regulator corresponding to second state information different from the first state information among the plurality of regulators and at least one second load corresponding to the second state information among the plurality of loads based on obtaining the second state information.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
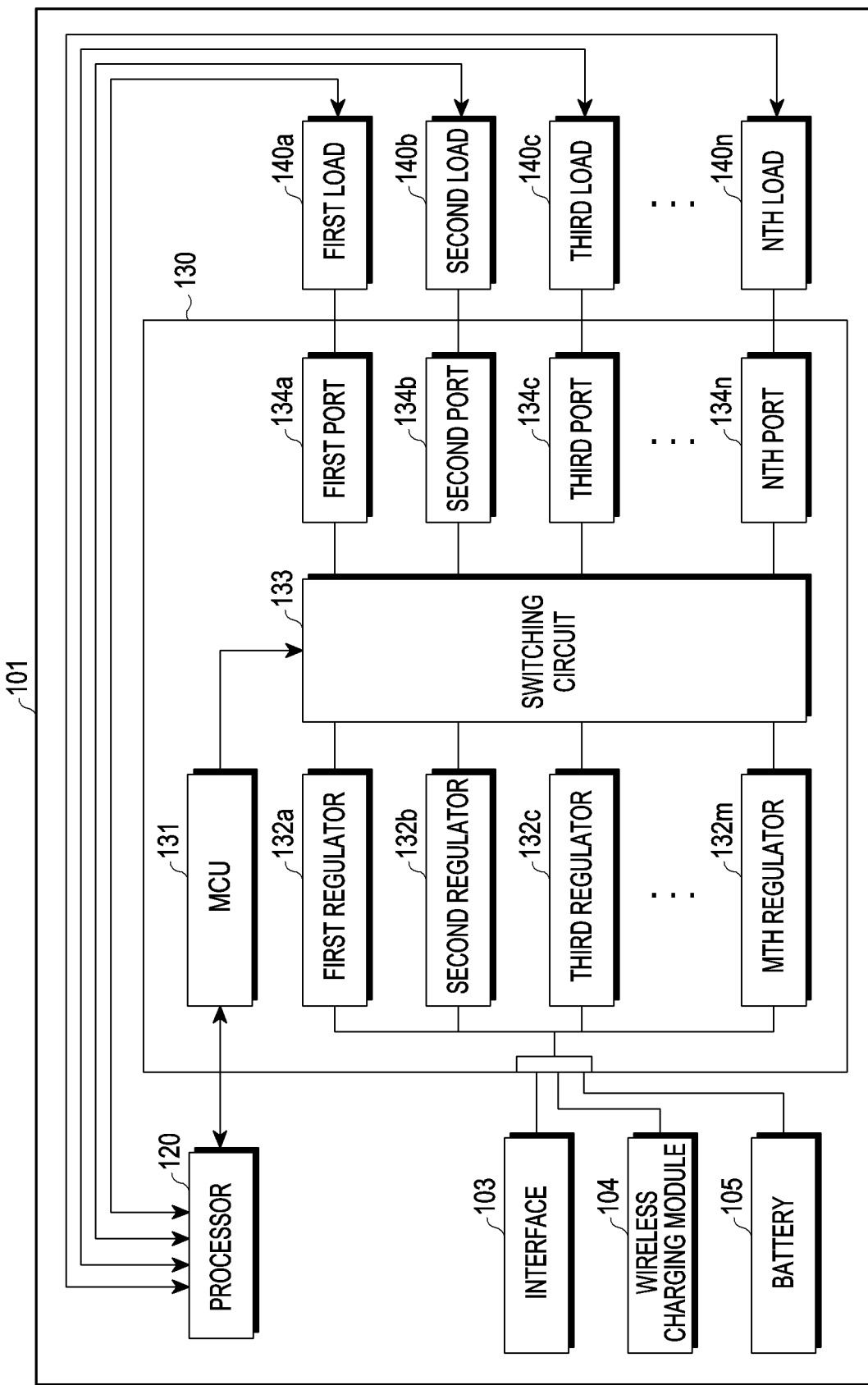
FIG. 1A is a block diagram illustrating an electronic device according to an embodiment.

FIG. 1A is a block diagram illustrating an electronic device according to an embodiment.

Referring to FIG. 1A, according to an embodiment, an electronic device 101 may include at least one of an interface 103, a wireless charging module 104, a battery 105, a processor 120, a power management circuit 130, or a plurality of loads 140a, 140b, and 140c to 140n. For example, a number of loads may be N.

According to an embodiment, the interface 103 is connected by a wire with an external power source to transfer power from the external power source to the power management circuit 130. The interface 103 may be implemented as, e.g., a connector for providing power or as a cable for providing power and a connector for connecting the cable to the external power source. For example, the interface 103 may be implemented as various universal serial bus (USB) types of connectors which are not limited to a specific type. When direct current (DC) power is received from the external power source, the interface 103 may transfer the received DC power to the power management circuit 130 or convert the magnitude of voltage of the power and transfer the converted power. When alternating current (AC) power is received from the external power source, the interface 103 may convert the AC power into DC power and/or convert the magnitude of voltage of the power and transfer the converted power to the power management circuit 130.

According to an embodiment, the wireless charging module 104 may be implemented in a scheme defined in wireless power consortium (WPC) standards (or Qi standards) or alliance for wireless power (A4WP) standards (or air fuel alliance (AFA) standards). The wireless charging module 104 may include a coil that produces an induced electromotive force by the magnetic field generated around and varying in magnitude over time. The process of producing an induced electromotive force through the coil may be represented as the wireless charging module 104 wirelessly receiving power. The wireless charging module 104 may include at least one of a reception coil, at least one capacitor, an impedance matching circuit, a rectifier, a DC-DC converter, or communication circuit. The communication circuit may be implemented as an on/off keying modulation/demodulation in-band communication circuit or as an out-of-band communication circuit (e.g., a Bluetooth low energy (BLE) communication module). According to an embodiment, the wireless charging module 104 may receive beam-formed radio frequency (RF) waves based on an RF scheme. According to an implementation, the wireless charging module 104 may be excluded from the electronic device 101.

According to an embodiment, the battery 105 may be implemented as a rechargeable secondary battery. The battery 105 may be charged with power received via the interface 103 and/or power received via the wireless charging module 104. Although not shown, according to an embodiment, the interface 103 and/or the wireless charging module 104 may be connected to a charger (or a converter) (not shown), and the battery 105 may be charged with power adjusted by the charger. The charger and/or converter may be implemented as an independent element from the power management circuit 130 or as at least part of the power management circuit 130. The battery 105 may transfer stored power to the power management circuit 130. The power from the interface 103 and/or the power from the wireless charging module 104 may be transferred to the battery 105 and/or to the power management circuit 130.

According to an embodiment, the processor 120 may execute, e.g., software to control at least one other component (e.g., a hardware or software component) of the electronic device 101 connected with the processor 120 and may process or compute various data. For example, the processor 120 may control other components, e.g., loads (e.g., the loads 140*a*, 140*b*, and 140*c* to 140*n* and/or an MCU 131), and the processor 120 may receive and process data from the loads (e.g., the loads 140*a*, 140*b*, and 140*c* to 140*n*) and/or the MCU 131. The processor 120 may load and process an instruction or data received from another component (e.g., an input device, sensor module and/or communication module) onto a volatile memory (e.g., a random access memory (RAM)), and the processor 120 may store resultant data in a non-volatile memory (e.g., a NAND). According to an embodiment, the processor 120 may include a main processor (e.g., a central processing unit (CPU) or an application processor), and additionally or alternatively, an auxiliary processor (e.g., a graphics processing unit (GPU), an image signal processor, a sensor hub processor, or a communication processor) that is operated independently from the main processor and that consumes less power than the main processor or is specified for a designated function. Here, the auxiliary processor may be operated separately from or embedded in the main processor. In other words, a plurality of chips or circuits capable of computation may be included in the electronic device 101. The auxiliary processor may control at least some of functions or states related to at least one load (e.g., an output device, sensor module, or communication module) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another load (e.g., a camera or a communication module) functionally related to the auxiliary processor. The memory may store various data used by at least one component (e.g., the processor 120 or a sensor module) of the electronic device 101, e.g., software and input data or output data for an instruction related to the software. The memory may include a volatile memory or a non-volatile memory. According to an embodiment, the memory may store information for task performing conditions corresponding to various tasks. The electronic device 101 may store the task performing conditions, with each piece of user identification information corresponding to a respective one of the task performing conditions. The memory may store load control information for various operations of the electronic device 101. The processor 120 may output computed information or control a driving circuit for moving to another point based on information obtained based on a load (e.g., a sensor module or communication circuit). According to an embodiment, at least some programs for operation of the electronic device 101 may be stored in an external device (e.g., a server). In this case, the electronic device 101 may send a query to the external device, and the external device may generate a response using data contained in the query and send the response to the electronic device 101.

In this disclosure, the phrase "electronic device 101 performs a particular operation" may mean that various loads, e.g., the processor 120 and/or an MCU 131, or other control circuits, or another load included in the electronic device 101 performs the particular operation. As the control circuit or another load performs a specific operation, power may be consumed. The phrase "electronic device 101 performs a particular operation" may also mean that the processor 120 and/or MCU 131 controls another load to perform the particular operation. The phrase "electronic device 101 performs a particular operation" may also mean that as an instruction for performing the particular operation stored in a storage circuit (e.g., a memory) of the electronic device 101 is executed, the processor 120 and/or MCU 131 or another load is triggered to perform the particular operation or the instruction is stored in the storage circuit.

According to an embodiment, the power management circuit 130 may include a plurality of regulators 132*a*, 132*b*, and 132*c* to 132*m*. The number M of the regulators 132*a*, 132*b*, and 132*c* to 132*m* may be identical to, or larger or smaller than the number N of a plurality of ports 134*a*, 134*b*, and 134*c* to 134*n*. Each of the plurality of regulators 132*a*, 132*b*, and 132*c* to 132*m* may regulate and output received power. For example, each of the plurality of regulators 132*a*, 132*b*, and 132*c* to 132*m* may adjust at least one of the magnitude of current and/or magnitude of voltage of the received power and output the adjusted power. Each of the plurality of regulators 132*a*, 132*b*, and 132*c* to 132*m* may suppress (or remove) noise (or ripples). Each of the plurality of regulators 132*a*, 132*b*, and 132*c* to 132*m* may be, e.g., a linear dropout (LDO) regulator (e.g., RT9011 model or AP7343 model) or a step-down regulator (e.g., LM3655 model or TPS54331 model) but it will be appreciated by one of ordinary skill in the art that the regulators are not limited to a specific kind or model.

According to an embodiment, at least some of the plurality of regulators 132*a*, 132*b*, and 132*c* to 132*m* may be of the same type. For example, all of the plurality of regulators 132*a*, 132*b*, and 132*c* to 132*m* may be of the same type or at least some of the plurality of regulators 132*a*, 132*b*, and 132*c* to 132*m* may be of a different type. The plurality of regulators 132*a*, 132*b*, and 132*c* to 132*m* may be connected to a switching circuit 133.

According to an embodiment, the switching circuit 133 may selectively connect each of the plurality of regulators 132*a*, 132*b*, and 132*c* to 132*m* to at least some of the plurality of ports 134*a*, 134*b*, and 134*c* to 134*n*. For example, one (e.g., the first regulator 132*a*) of the plurality of regulators 132*a*, 132*b*, and 132*c* to 132*m* may be connected to one or more of the plurality of ports 134*a*, 134*b*, and 134*c* to 134*n* via the switching circuit 133. The switching circuit 133 may include a plurality of switches that connect each of the plurality of regulators 132*a*, 132*b*, and 132*c* to 132*m* to at least one of the plurality of ports 134*a*, 134*b*, and 134*c* to 134*n*. Each of the plurality of switches included in the switching circuit 133 may be controlled to be turned on or turned off based on a control signal from, e.g., the MCU 131. Each of the plurality of switches may be implemented as, e.g., various types of MOSFETs, and the state of each switch may be controlled as the voltage applied to the gate is adjusted. In this disclosure, the operation of applying a specific voltage to the gate so that the switch is controlled to turn on may be performed by the electronic device 101 (e.g., the MCU 131). When no specific voltage is applied to the gate, the switching circuit 133 may also be represented as being controlled by the electronic device 101 (e.g., the MCU 131).

According to an embodiment, the MCU 131 may output a control signal of the switching circuit 133 based on information received from the processor 120. The MCU 131 may receive data from the processor 120 or transfer data to the processor 120 based on various inter-chip interfaces, e.g., SPI, I2C, GPIO, UART, or ADC, and the interface is not limited to a specific type or kind. The MCU 131 may be implemented as a chip capable of processing received information and outputting a switch control signal and is not limited to a specific type or kind. When the processor 120 is implemented as an application processor (AP), the MCU 131 may be implemented as a chip which has lower computation capability than the AP but is not limited thereto. The MCU 131 may select a regulator to be operated based on information received from the processor 120 (e.g., state information for the electronic device 101 and/or information associated with driving (or power consumption) of at least one load. When the MCU 131 receives the state information for the electronic device 101, the MCU 131 may identify information associated with driving (or power consumption) of the load corresponding to the state information. For example, the MCU 131 may identify information (e.g., Table 1 described below) indicating the relationships between state information identifiers and current and/or voltage magnitudes corresponding to respective load or information (e.g., Table 2 described below) indicating the relationships between state information identifiers, regulators, regulator control information, and switch on/off information. The above-described information is described below. The MCU 131 may provide a control signal of the switching circuit based on the information associated with driving (or power consumption) of load. The MCU 131 may directly provide a control signal of the switching circuit based on the state information for the electronic device 101. The MCU 131 may transfer switch on/off control information capable of controlling the on/off states of the switches to the switching circuit 133. The state of each switch in the switching circuit 133 may be controlled to be turned on or turned off based on the received switch on/off control information. The switch on/off control information may be transferred directly to the switches. The switching circuit 133 may include an element for generating control signals in which case the element for generating control signals may generate control signals for controlling the state of at least one of the switches using the switch on/off control information and transfer the generated control signals.

The processor 120 may select at least one load to be driven from among the plurality of loads 140a, 140b, and 140c to 140n. As described above, the processor 12 may determine an operation to be performed based on data received via an input device or data received via communication and/or sensing data and may select at least one load based on the operation to be performed. For example, when the processor 120 determines to perform the operation of moving the electronic device 101 from the current position to another position, the processor 120 may transfer state information for the electronic device 101, which corresponds to the operation, and/or information for an operation condition for the driving device to the MCU 131. The MCU 131 may select a load (e.g., a motor) to be driven among the plurality of loads 140a, 140b, and 140c to 140n based on the received information. When the processor 120 determines to perform the operation of outputting a voice, the processor 120 may select a speaker from among the plurality of loads 140a, 140b, and 140c to 140n. According to an embodiment, the processor 120 may determine to simultaneously perform a plurality of operations and may select a plurality of loads for the plurality of operations. In other embodiment, even performing one operation, the processor 120 may select a plurality of loads.

According to an embodiment, the processor 120 may transfer information associated with the at least one selected load to the MCU 131. The processor may transfer information for the selected load and operation condition of the selected load (e.g., the magnitude of voltage and/or the magnitude of current) to the MCU 131 or transfer state information for the electronic device 101 to the MCU 131. The MCU 131 may select at least one regulator to be driven based on the received information. For example, the MCU 131 may select at least one regulator to be driven based on the magnitude of current required by the at least one selected load. As described below in greater detail, the efficiency of a regulator may be varied depending on the magnitude of current output from the regulator. For example, when the current output from a specific regulator has a first magnitude, the specific regulator may have a first efficiency and, when the current output from the regulator has a second magnitude, the specific regulator may have a second efficiency, wherein the first efficiency may be relatively high, meaning that the specific regulator operates in a relatively high efficiency when the first magnitude of current is output from the specific regulator. The MCU 131 may select a regulator based on at least one selected load so that the efficiency of the driven regulator has maximum efficiency. The phrase "driven regulator has maximum efficiency" may mean that the overall efficiency of the selected regulator is high as compared with the efficiency of other combination of regulators other than the selected regulator. If a first load 140a is determined to be operated, the first load 140a may require a second magnitude of current. Rather than driving one regulator to output the second magnitude of current, the MCU 131 may perform control so that each of two regulators outputs the first magnitude of current. In this case, the overall efficiency of the two regulators may be higher than the efficiency of one regulator and various examples related thereto are described below in greater detail. The MCU 131 may control the switching circuit 133 so that at least one selected regulator connects to a load.

As described above, at least some of the regulators 132a, 132b, and 132c to 132m may be connected to at least some of the plurality of ports 134a, 134b, and 134c to 134n, and the connections may be varied based on a control signal from the MCU 131. The MCU 131 may determine a connection for the optimal efficiency based on the operating load and load operation condition. Each of the plurality of ports 134a, 134b, and 134c to 134n may be connected to the plurality of loads 140a, 140b, and 140c to 140n. The plurality of ports 134a, 134b, and 134c to 134n may be a component to connect the power management circuit 130 to the plurality of loads 140a, 140b, and 140c to 140n but, according to an implementation, the plurality of ports 134a, 134b, and 134c to 134n may be omitted. As set forth above, the MCU 131 may perform computation associated with providing power, and the processor 120 may perform computation for actual operations. As such, computation may be performed in a two-track manner.

According to an embodiment, each of the plurality of loads 140a, 140b, and 140c to 140n may be a component, or a set of components, of the electronic device 101, which consumes power. For example, when the electronic device 101 is implemented as a robot, the loads may include a processor, a memory, a communication circuit, a display for displaying screen, a speaker for outputting voice, a microphone for obtaining voice, a sensor, and an actuator, but are not limited thereto. The term "load" may also be referred to as hardware, client, peripheral device, power consuming element, or element. The term "load" may mean one component or may also mean a set of a plurality of components. For example, when the electronic device 101 is implemented as a human robot, the first load 140a may be a display or may be a head unit including a display, an actuator for driving the head unit, or a speaker.

Figure 1B:
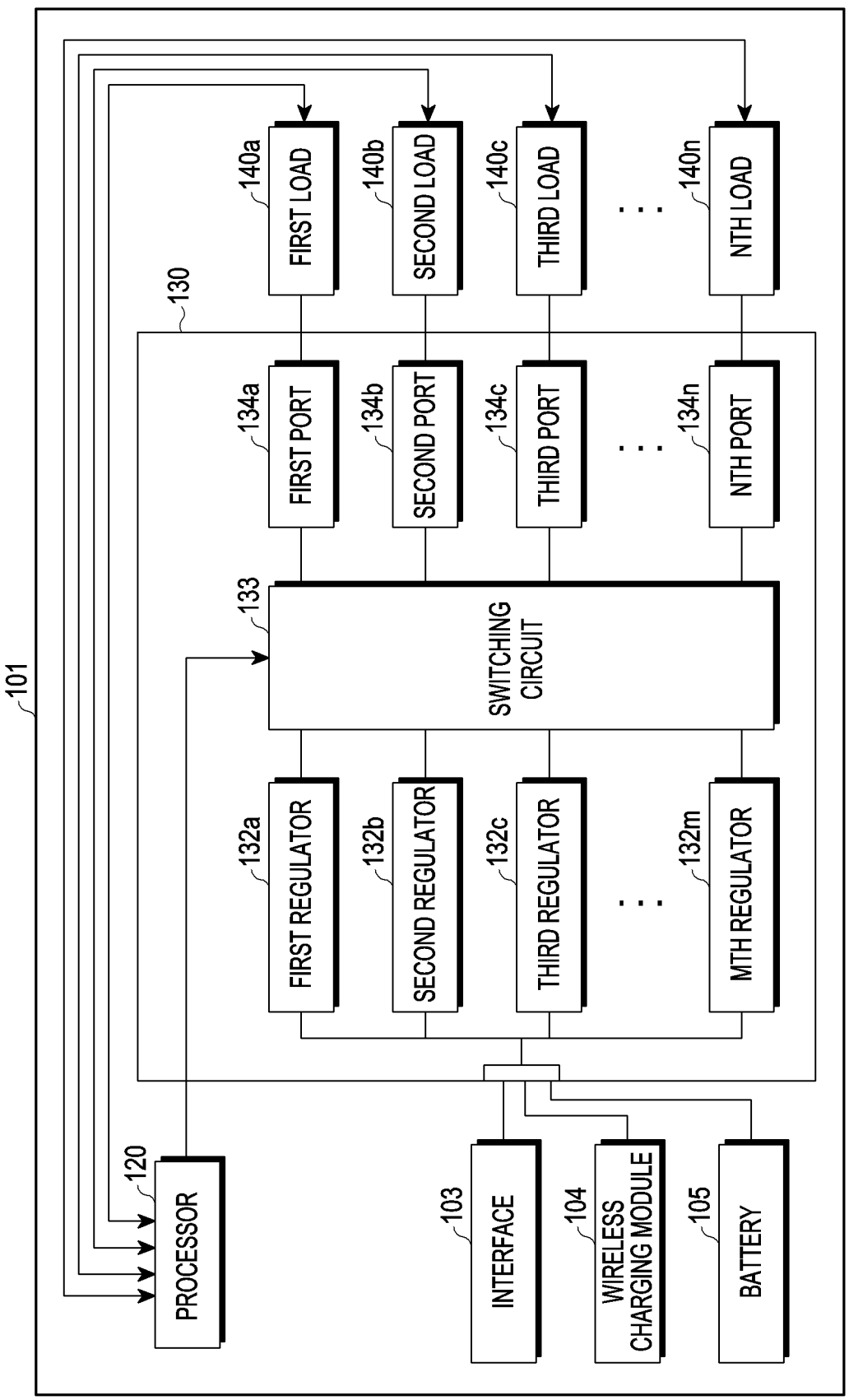
FIG. 1B is a block diagram illustrating an electronic device according to an embodiment.

FIG. 1B is a block diagram illustrating an electronic device according to an embodiment.

Referring to FIG. 1B, the power management circuit 130 of the electronic device 101 might omit MCU 131. According to an embodiment, the processor 120 outside the power management circuit 130 may determine on/off control information for the switches included in the switching circuit 133. As set forth above, the processor 120 may determine the operation of the electronic device 101 and determine at least one load corresponding thereto and its operation condition. The processor 120 may determine at least one regulator to be connected to at least one load based on at least one load and its operation condition. The processor 120 may determine the on/off state of the switches in the switching circuit 133 to enable the determined regulator to connect to at least one load. The processor 120 may transfer switch on/off control information for controlling the on/off state of the switches to the power management circuit 130. The state of each switch in the power management circuit 130 may be controlled to be turned on or turned off based on the received switch on/off control information. The switch on/off control information may be transferred directly to the switches. The switching circuit 133 may include an element for generating control signals in which case the element for generating control signals may generate control signals for controlling the state of at least one of the switches using the switch on/off control information and transfer the generated control signals.

Figure 1C:
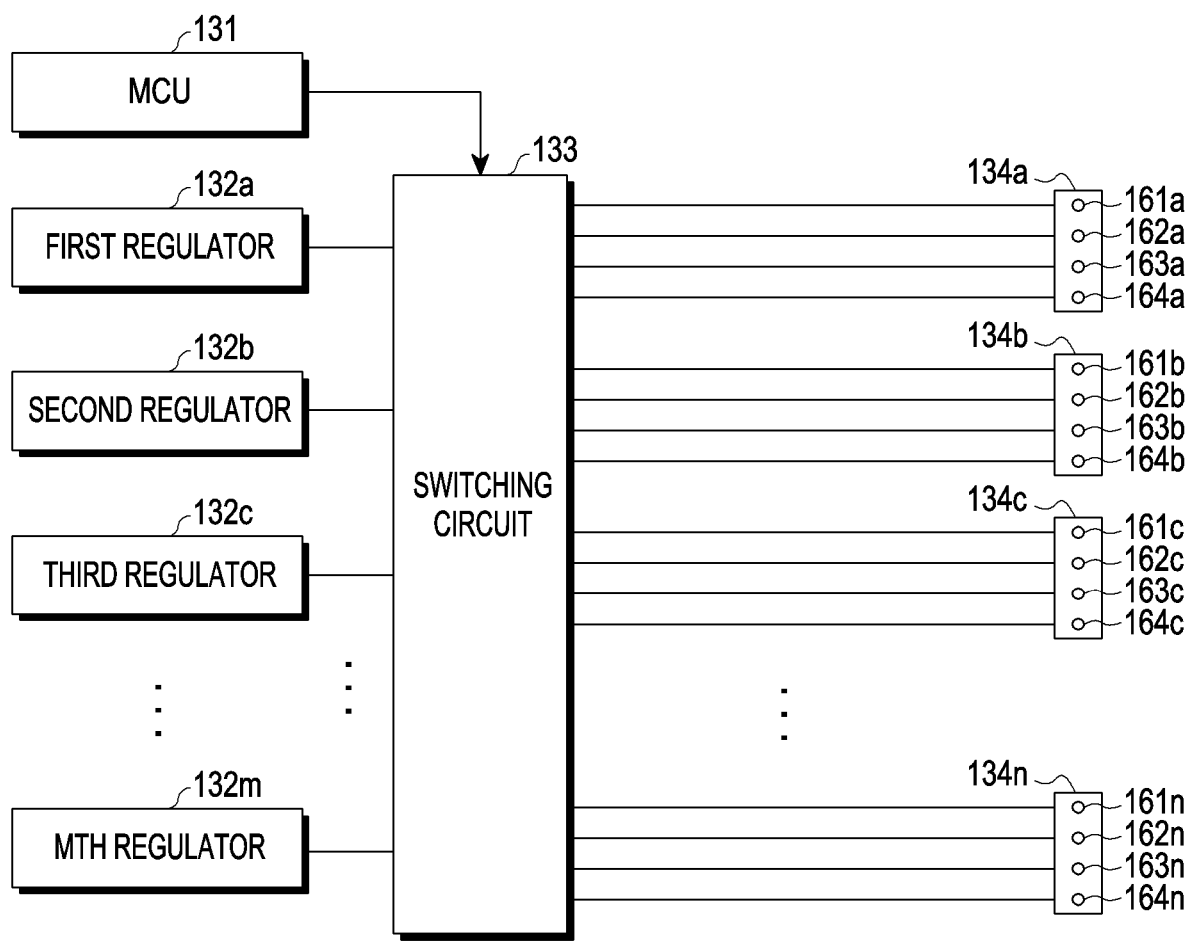
FIG. 1C is a block diagram illustrating a power management circuit according to an embodiment.
Figure 1D:
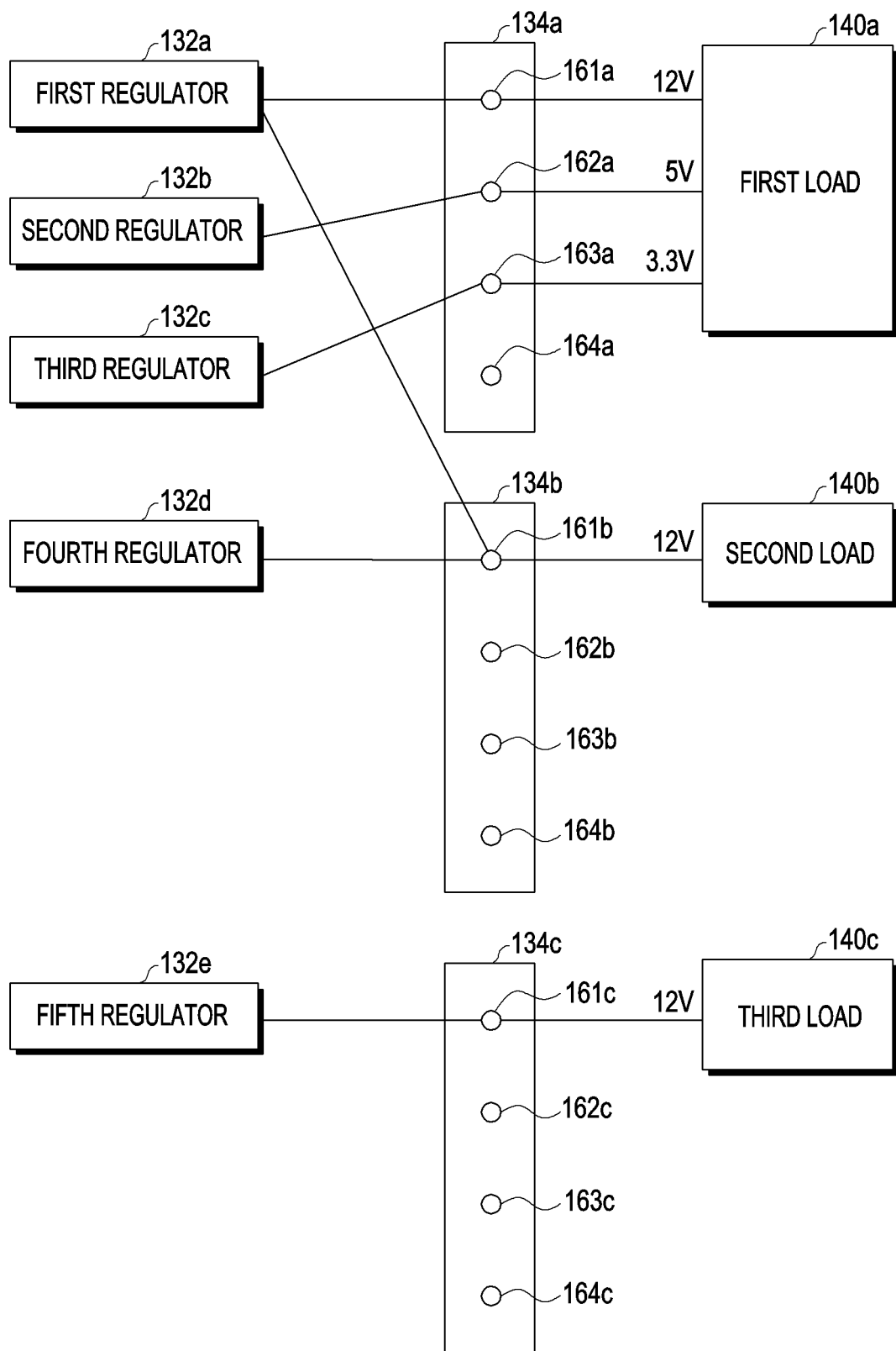
FIG. 1D is a view illustrating connections between regulators and ports according to an embodiment.

FIG. 1C is a block diagram illustrating a power management circuit according to an embodiment. FIG. 1D is a view illustrating connections of ports to loads according to an embodiment.

According to an embodiment, a plurality of ports 134a, 134b, and 134c to 134n of the power management circuit 130 each may include a plurality of sub ports 161a, 162a, 163a, 164a, 161b, 162b, 163b, 164b, 161c, 162c, 163c, 164c, 161n, 162n, 163n, and 164n. The plurality of sub ports 161a, 162a, 163a, and 164a are configured to output different voltages, but are not limited thereto. For example, as shown in FIG. 1D, the first sub port 161a, the second sub port 162a, and the third sub port 163a of the first port 134a may be configured to output 12V, 5V, and 3.3V, respectively. According to an embodiment, the first load 140a may require two or more voltages (e.g., 12V, 5V, and 3.3V). In this case, the first load 140a may connect to the first sub port 161a, the second sub port 162a, and the third sub port 163a to receive power processed by the first regulator 132a, the second regulator 132b, and the third regulator 132c. The second load 140b may require power of a single voltage, e.g., 12V. The second load 140b may connect to, e.g., the first sub port 161a and the fifth sub port 161b to receive power from the first regulator 132a and the fourth regulator 132d. The third load 140c may require power of a single voltage, e.g., 12V. The third load 140c may connect to, e.g., the ninth sub port 161c to receive power from the fifth regulator 132e. According to an embodiment, the MCU 131 may control the switching circuit 133 to form the regulator-load connection as shown in FIG. 1D. According to an embodiment, each of the plurality of sub ports may be represented as an individual port.

Figure 2A:
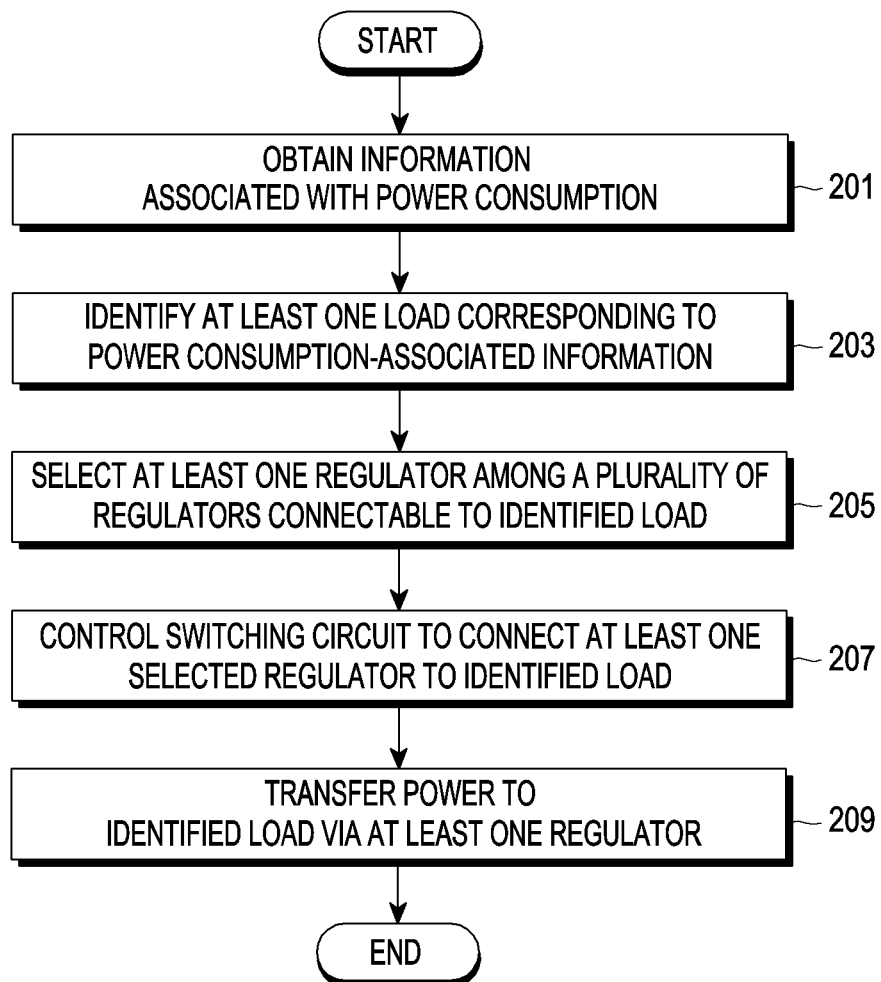
FIG. 2A is a flowchart illustrating a method for operating an electronic device according to an embodiment.

FIG. 2A is a flowchart illustrating a method for operating an electronic device according to an embodiment. As set forth above, the operations of FIG. 2A may be performed by the processor 120 alone, which is positioned outside the power management circuit 130, or the MCU 131 alone, which is positioned in the power management circuit 130 or may be performed by the MCU 131 in the power management circuit 130 and the processor 120, e.g., an external processor. The order of performing the operations of FIG. 2A is not limited to that shown in FIG. 2A, and the order of performing some operations may be changed. More operations may be added between two consecutive operations, and some of the operations of FIG. 2 may be omitted. What has been described above may apply likewise to other flowcharts of the disclosure.

According to an embodiment, the electronic device 101 (e.g., at least one of the processor 120 or the MCU 131) may obtain power consumption-associated information in operation 201. The power consumption-associated information may include information for operations to be performed in the electronic device 101 and/or information for the state to be transitioned. As set forth above, the electronic device 101 may determine a corresponding operation based on various triggers, such as sensed information, user input, or information received via communication. The information indicating the operation to be performed may be referred to as operation information which may include at least one of, e.g., information for the load to be driven, load operation condition (e.g., the magnitude of power and/or voltage required by the load), or information for controlling the operation of the load. The electronic device 101 may manage the operations to be performed in units of state information. For example, first state information may be of a state of allowing the electronic device 101 to move, and second state information may be of a state of allowing a screen to be output via a display. According to an embodiment, a plurality of operations may be defined in one state. The electronic device 101 may identify corresponding state information based on various triggers, such as sensed information, user input, or information received via communication. Tables 1 and 2 show examples of state information managed by the electronic device 101 according to an embodiment. It will be appreciated by one of ordinary skill in the art that the power consumption-associated information may be any piece of information by which power consumption may be identified when the electronic device 101 determines to consume power, as well as the above-described operation information and state information.

According to an embodiment, the electronic device 101 may identify the load corresponding to the power consumption-associated information in operation 203. For example, the electronic device 101 may identify the load from the operation information or may identify the load corresponding to the state information. The electronic device 101 may identify one or more loads. For example, the processor 120 outside the power management circuit 130 may transfer the operation information to the MCU 131, and the MCU 131 may identify the load based on the received operation information. For example, the processor 120 outside the power management circuit 130 may transfer the state information to the MCU 131, and the MCU 131 may identify the load based on the received state information. The MCU 131 may load a table by which the received information may be referenced. The MCU 131 may identify the load corresponding to the received state information by referring to a pre-stored table but is not limited to a specific identification scheme.

According to an embodiment, in operation 205, the electronic device 101 may select at least one from among a plurality of regulators connectable to the identified load. The electronic device 101 may determine to connect at least one regulator to the selected load while allowing no regulator to connect to the non-selected load. The electronic device 101 may configure connections between the plurality of regulators and the plurality of loads depending on the power consumption-associated information. When the power consumption-associated information is varied, the electronic device 101 may reconfigure the connections between the plurality of regulators and the plurality of loads. For example, the electronic device 101 may select at least one regulator so that the efficiency (e.g., the sum of efficiencies or mean efficiency) of at least one selected regulator meets a designated condition. For example, the electronic device 101 may identify the magnitude of current required by the identified load and select at least one regulator so that the magnitude of current may be provided in an efficiency not less than a designated threshold efficiency. The operation of selecting at least one regulator so that the efficiency meets the designated condition is described below in greater detail. In operation 207, the electronic device 101 may control the switching circuit to connect at least one selected regulator to the identified load. The electronic device 101 may control the switching circuit to connect any one regulator to a plurality of loads or may control the switching circuit to connect a plurality of regulators to any one load.

In operation 209, the electronic device 101 may transfer power to the identified load via at least one regulator. As set forth above, any one regulator may transfer power to one or more loads, or one or more regulators may transfer power to any one load. Regulating may be performed in the efficiency meeting the designated condition and, the use time of the battery may thus be increased.

Figure 2B:
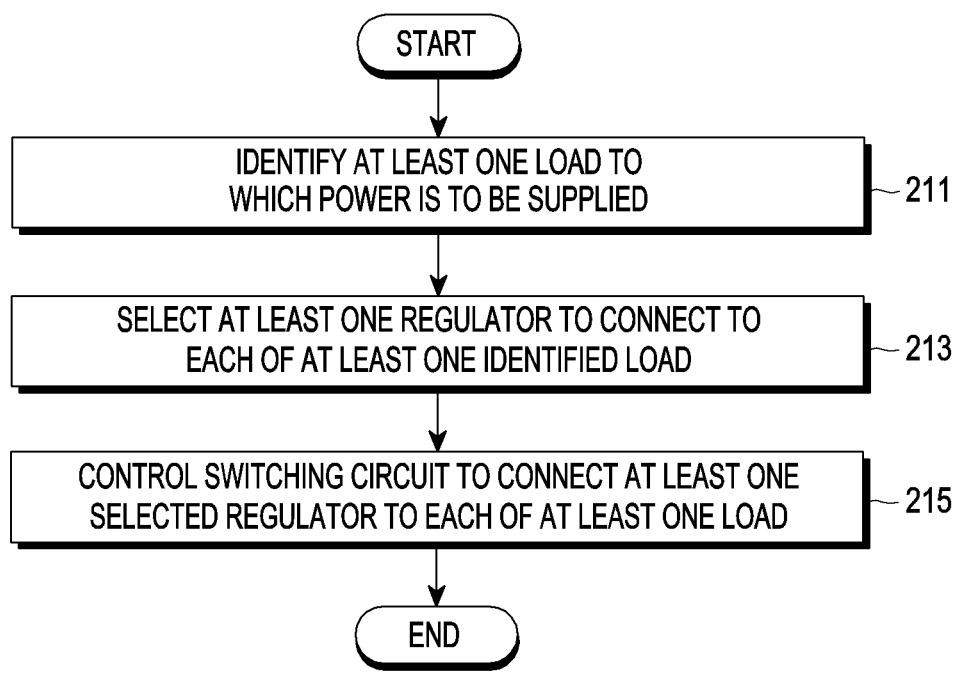
FIG. 2B is a flowchart illustrating a method for operating an electronic device according to an embodiment.

FIG. 2B is a flowchart illustrating a method of operating an electronic device according to an embodiment. The operations of FIG. 2B may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, in operation 211, the electronic device 101 may identify at least one load to which power is to be supplied. As set forth above, the electronic device 101 may identify at least one load corresponding to state information for the electronic device 101.

According to an embodiment, in operation 213, the electronic device 101 may select at least one regulator which is to connect to each of at least one load. The electronic device 101 may be configured to identify at least one of the magnitude of current or magnitude of voltage required by each of at least one load and select at least one regulator to connect to the at least one load among a plurality of regulators based on at least one of the magnitude of current or magnitude of voltage required by each of the at least one load. The electronic device 101 may select the at least one regulator with a value of power conversion efficiency that is equal to or exceeds a predetermined value of power conversion efficiency based on at least one of the magnitude of current or magnitude of voltage required by each of at least one load. In operation 215, the electronic device 101 may control the switching circuit to connect at least one selected regulator to each of at least one load.

Figure 3:
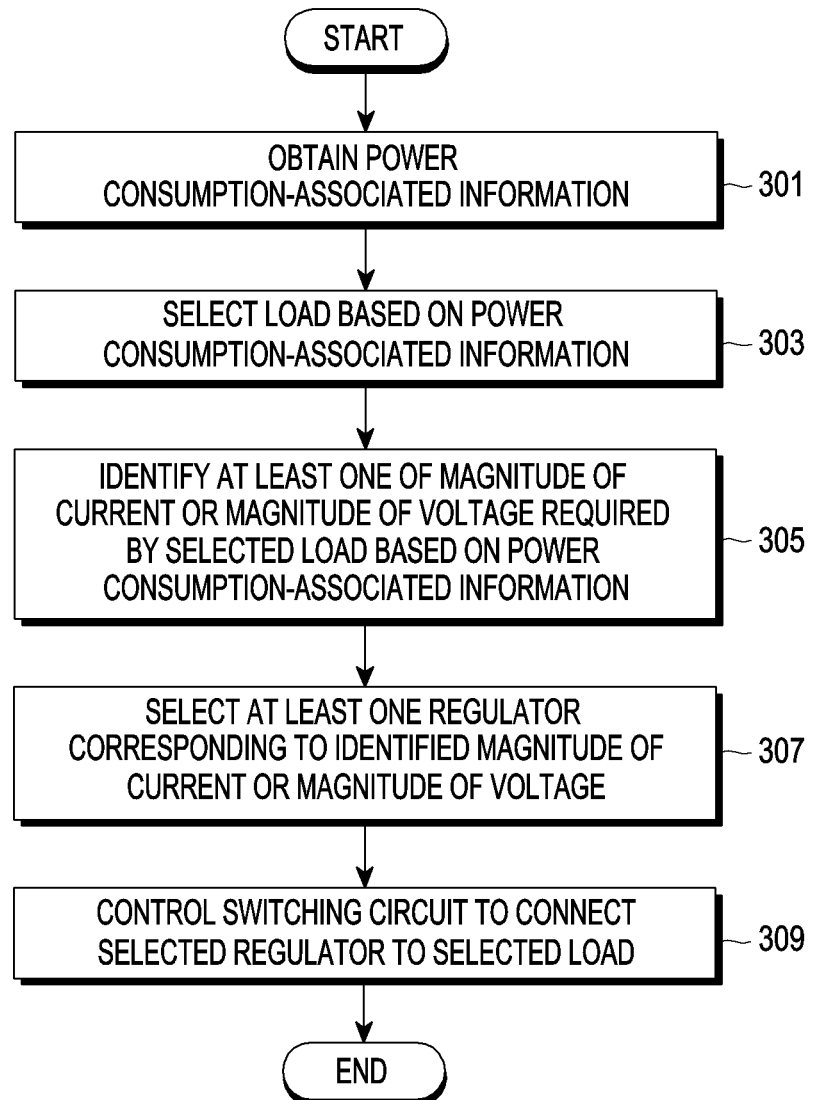
FIG. 3 is a flowchart illustrating a method for operating an electronic device according to an embodiment.
Figure 4A:
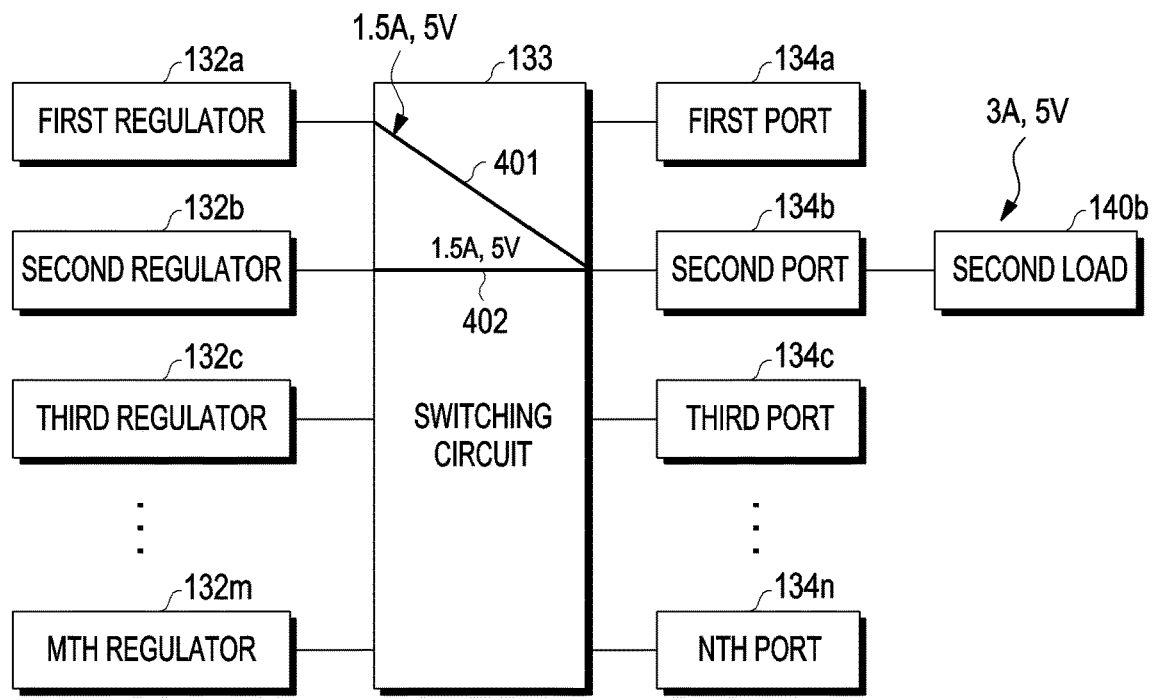
FIG. 4A is a view illustrating connections between regulators and loads according to an embodiment.
Figure 4B:
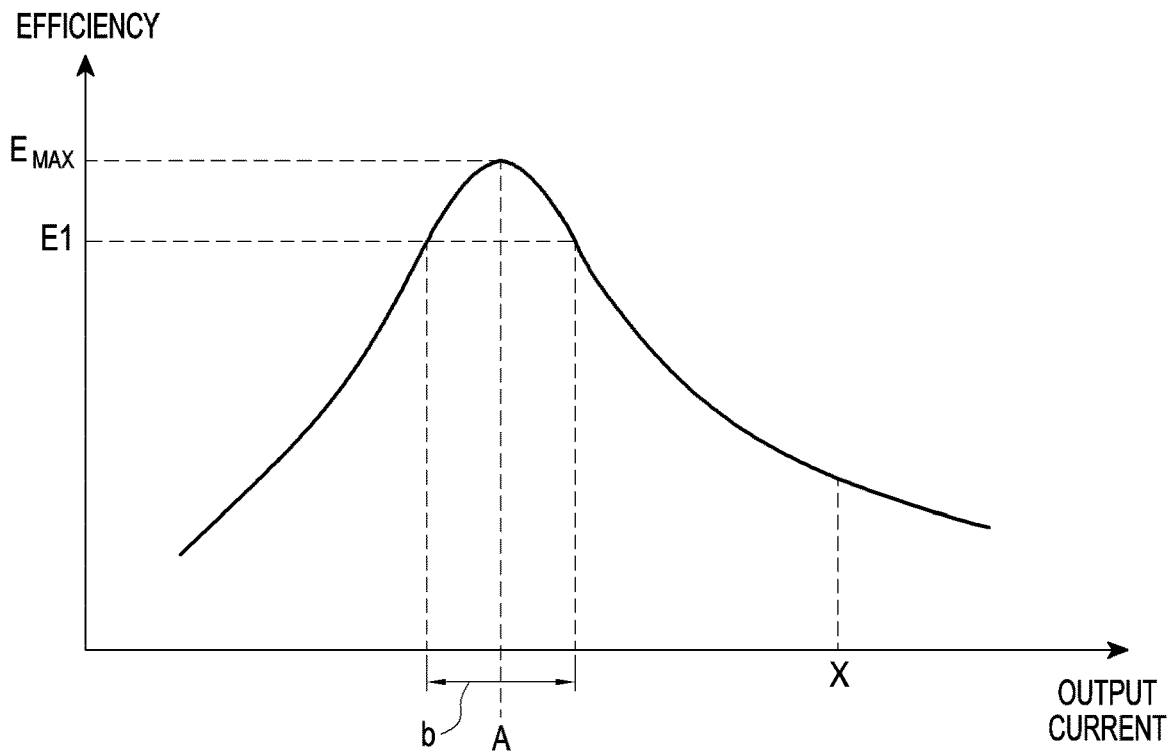
FIG. 4B is a graph illustrating the efficiency per magnitude of current output from a regulator according to an embodiment.

FIG. 3 is a flowchart illustrating a method for operating an electronic device according to an embodiment. The embodiment of FIG. 3 is described below in detail with reference to FIGS. 4A and 4B. FIG. 4A is a view illustrating connections between regulators and loads according to an embodiment. FIG. 4B is a graph illustrating the efficiency per magnitude of current output from a regulator according to an embodiment. The operations of FIG. 3 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, in operation 301, the electronic device 101 may obtain power consumption-associated information. In operation 303, the electronic device 101 may select a load based on the power consumption-associated information. In operation 305, the electronic device 101 may identify at least one of the magnitude of current or magnitude of voltage required by the load selected based on the power consumption-associated information. The electronic device 101 may identify at least one of the magnitude of current or magnitude of voltage required by the load included in the operation information. Alternatively, the electronic device 101 may identify at least one of the magnitude of current or magnitude of voltage required by the load based on the state information. The electronic device 101 may identify the magnitude of current or magnitude of voltage required by the load in such a way as to compare pre-store data with received data or, according to an implementation, the electronic device 101 may directly calculate at least one of the magnitude of current or magnitude of voltage required by the load.

According to an embodiment, in operation 307, the electronic device 101 may select at least one regulator corresponding to the identified magnitude of current or magnitude of voltage. For example, as shown in FIG. 4A, the electronic device 101 may select the second load 140b as a load to be operated. Further, the electronic device 101 may identify that the second load 140b requires a current of 3 A and a voltage of 5V for a selected operation. The second load 140b may require a fixed current of 3 A or may also require various magnitudes of currents based on the kind of operation, performing mode, and/or performing speed. The electronic device 101 may select the first regulator 132a and the second regulator 132b to be able to provide a current of 3 A to the second load 140b. The electronic device 101 may determine a regulator and the connection between the regulator and the load based on the efficiency of the at least one selected regulator. For example, as shown in FIG. 4B, one regulator may have a different power conversion efficiency per output current. For example, when the output current is an A, the power conversion efficiency may be the maximum value $E_{MAX}$. When the output current is within a first range b, the power conversion efficiency may be a threshold E1 or more.

Figure 4C:
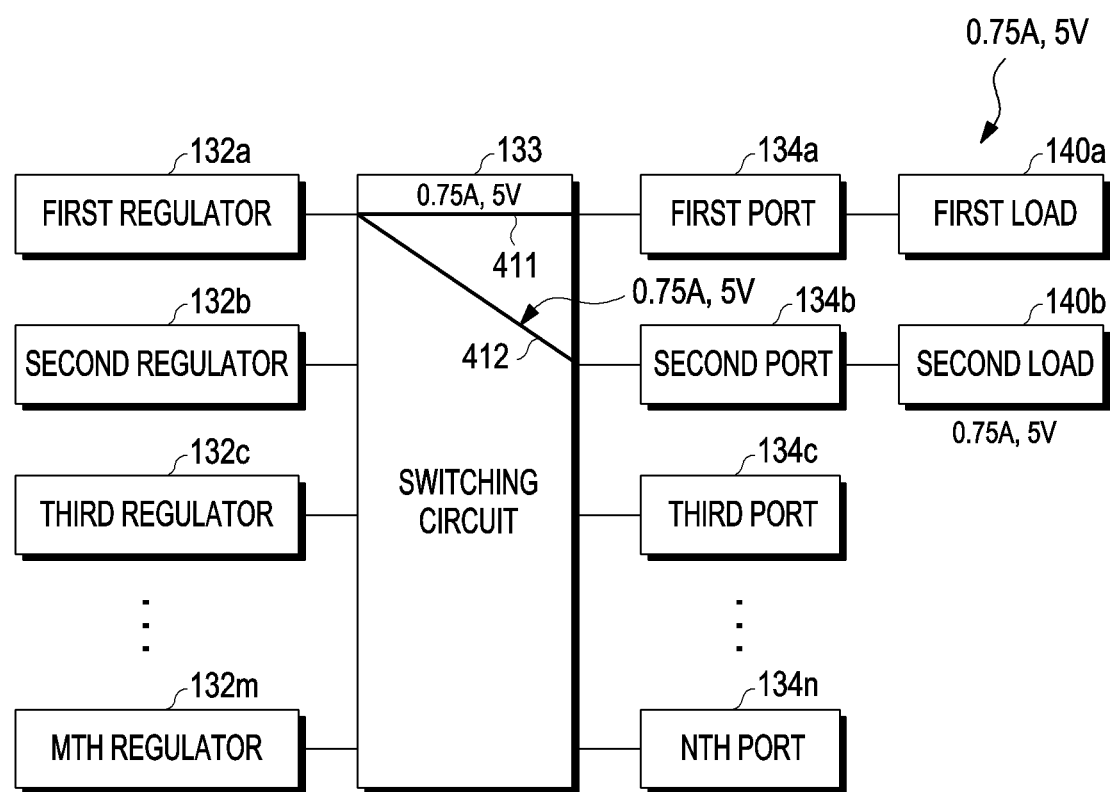
FIG. 4C is a view illustrating connections between regulators and loads according to an embodiment.

According to an embodiment, the electronic device 101 may store in advance information for efficiency of each of the plurality of regulators 132a, 132b, and 132c to 132m included in the electronic device 101 per output current. The electronic device 101 may identify a current to be provided per regulator so that the power conversion efficiency is maximum. For example, in the embodiment of FIG. 4A, the first regulator 132a and the second regulator 132b are assumed to have the maximum efficiency when their output currents are 1.5 A. The electronic device 101 may identify that the maximum power conversion efficiency is shown when 1.5 A and 1.5 A of the 3 A current are provided to the first regulator 132a and the second regulator 132b, respectively. In this case, the first regulator 132a and the second regulator 132b each may perform regulating in the maximum power conversion efficiency. The electronic device 101 may determine the number of regulators and connections to loads for the maximum efficiency using information for efficiencies per output current. The electronic device 101 may store in advance information for the first range b in which the power conversion efficiency of each of the regulators 132a, 132b, and 132c to 132m is a threshold E1 or more. The electronic device 101 may select regulators so that the number of regulators to output a current of a magnitude within the first range is maximum. Or, the electronic device 101 may select regulators so that the power conversion average (or sum) of regulators is the maximum. As set forth above, the electronic device 101 may select regulators and connections between regulators and loads so that the maximum power conversion efficiency as possible is shown or a power conversion efficiency which is the threshold or more is shown. In operation 309, the electronic device 101 may control the switching circuit 133 so that the first regulator 132a selected is connected to the selected load via the first path 401, and the second regulator 132b is connected to the selected load via the second path 402. FIG. 4C is a view illustrating connections between regulators and loads according to an embodiment. FIG. 4C may illustrate an example of selecting at least one regulator and controlling the switching circuit in, e.g., operations 305, 307, and 309 of FIG. 3.

In the embodiment of FIG. 4C, the electronic device 101 may select, e.g., the first load 140a and the second load 140b as loads to be driven. The electronic device 101 may identify that the first load 140a requires a current of 0.75 A and a voltage of 5V, and the second load 140b requires a current of 0.75 A and a voltage of 5V. The electronic device 101 may allow the first regulator 132a to provide a current of 1.5 A, thereby enabling the regulation to be performed with a relatively high power conversion efficiency. The electronic device 101 may control the switching circuit 133 to allow the first regulator 132a to connect to the first port 134a and the second port 134b via the first path 411 and the second path 412. For example, the same magnitude of current may flow through the first path 411 and the second path 412.

Figure 4D:
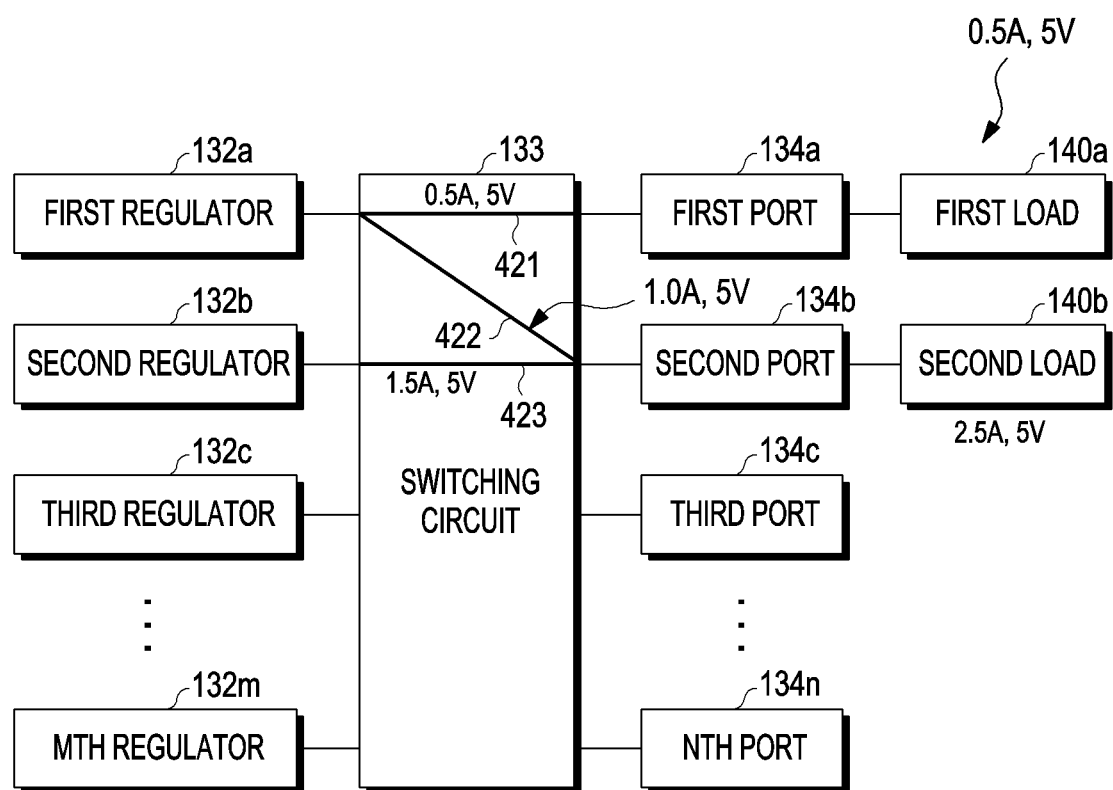
FIG. 4D is a view illustrating connections between regulators and loads according to an embodiment.

FIG. 4D is a view illustrating connections between regulators and loads according to an embodiment. FIG. 4D may illustrate an example of selecting at least one regulator and controlling the switching circuit in, e.g., operations 305, 307, and 309 of FIG. 3.

In the embodiment of FIG. 4D, the electronic device 101 may select, e.g., the first load 140a and the second load 140b as loads to be driven. The electronic device 101 may identify that the first load 140a requires a current of 0.5 A and a voltage of 5V, and the second load 140b requires a current of 2.5 A and a voltage of 5V. The electronic device 101 may allow the first regulator 132a and the second regulator 132b each to provide a current of 1.5 A, thereby enabling the regulation to be performed with a relatively high power conversion efficiency. The electronic device 101 may control the switching circuit 133 to allow the first regulator 132a to connect to the first port 134a and the second port 134b via the first path 421 and the second path 422. The electronic device 101 may perform control to allow a current of 0.5 A to flow through the first path 421 and a current of 1.0 A to flow through the second path 422. The electronic device 101 may control the switching circuit 133 to allow the second regulator 132b to connect to the second port 134b via the third path 423.

Figure 5A:
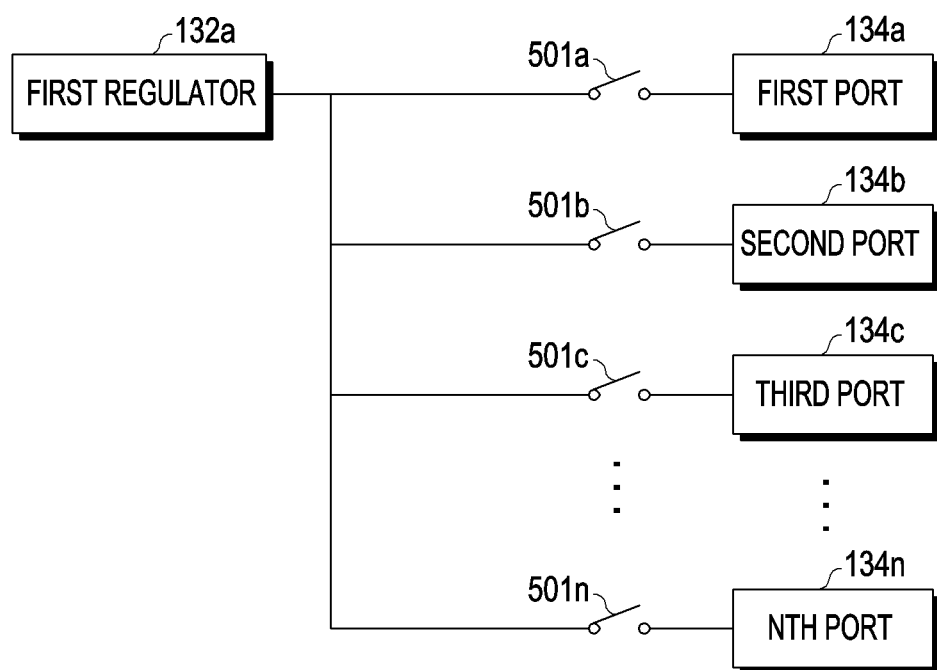
FIG. 5A is a view illustrating switches in a switching circuit according to an embodiment.

FIG. 5A is a view illustrating switches in a switching circuit according to an embodiment. FIG. 5 may illustrate, e.g., the switching circuit 133 of FIG. 1A.

According to an embodiment, the switching circuit 133 may include a plurality of switches 501a, 501b, and 501c to 501n for selectively connecting the first regulator 132a to connect to each of the plurality of ports 134a, 134b, and 134c to 134n. Although not shown for ease of description, the switching circuit 133 may include a plurality of switches for selectively connecting at least one remaining regulator to each of the plurality of ports 134a, 134b, and 134c to 134n. For example, the switching circuit 133 may include M*N switches. For example, as shown in FIG. 4C, the electronic device 101 may determine to connect the first regulator 132a to the first port 134a and the second port 134b. In this case, the electronic device 101 may control the switch 501a and the switch 501b to turn on and control the other switches 501c to 501n to turn off. The electronic device 101 may control the switches corresponding to the other regulators to turn off.

In an example, the switching circuit 133 may include a first port switch 511a connected to the first port 134a, a second port switch 511b connected to the second port 134b, a third port switch 511c connected to the third port 134c, and a nth port switch 511n connected to the nth port 134n. The switching circuit 133 may include a first switch 512a for selectively connecting between the path from the first regulator 132a and the path from the second regulator 132b, a second switch 512b for selectively connecting between the path from the second regulator 132b and the path from the third regulator 132c, a third switch 512c for selectively connecting between the path from the third regulator 132c and the path from the fourth regulator (not shown), and an (n−1)th switch 512(n−1) for selectively connecting between the path from the (n−1)th regulator and the path from the Mth regulator 132m. For example, when the first regulator 132a and the second regulator 132b are determined to connect to the second port 134b as shown in FIG. 4A, the electronic device 101 may control the first switch 512a and the second port switch 511b to turn on and control the remaining switches to turn off. For example, when the first regulator 132a is determined to connect to the first port 134a and the second port 134b, and the second regulator 132b is determined to connect to the second port 134b as shown in FIG. 4D, the electronic device 101 may control the first switch 512a, the first port switch 511a, and the second port switch 511b to turn on and control the remaining switches to turn off.

Figure 5B:
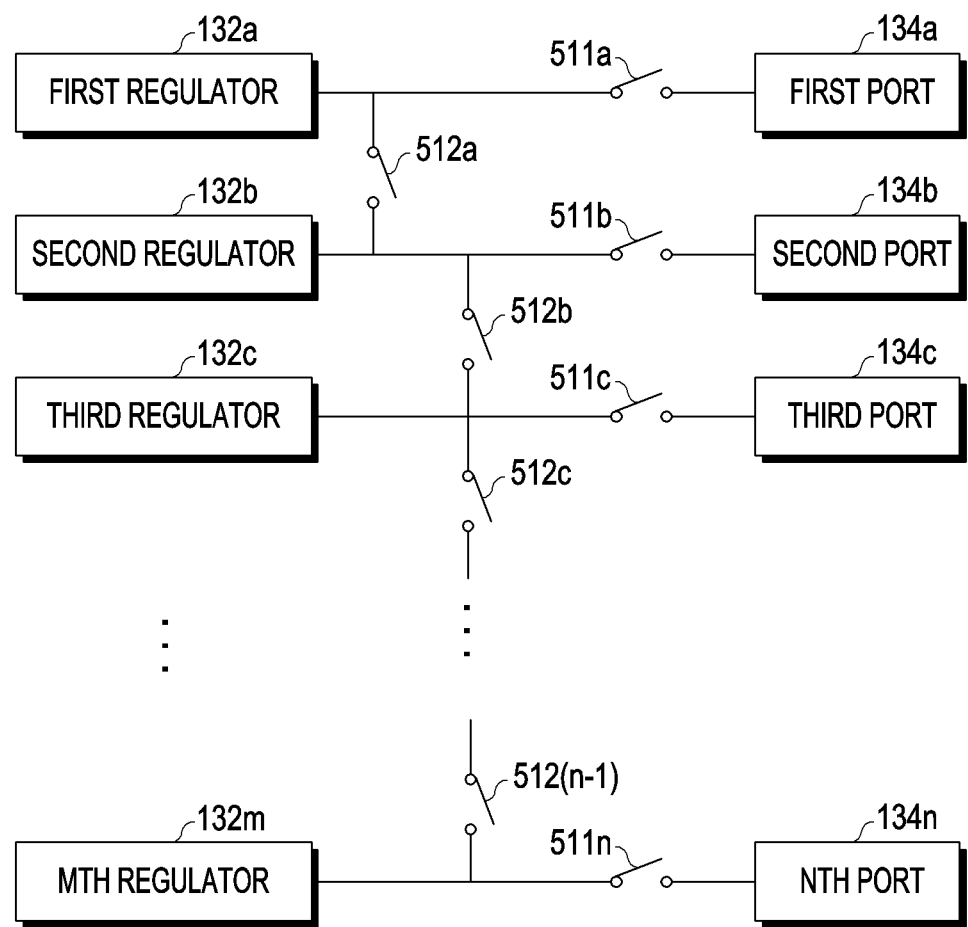
FIG. 5B is a view illustrating switches in a switching circuit according to an embodiment.
Figure 5C:
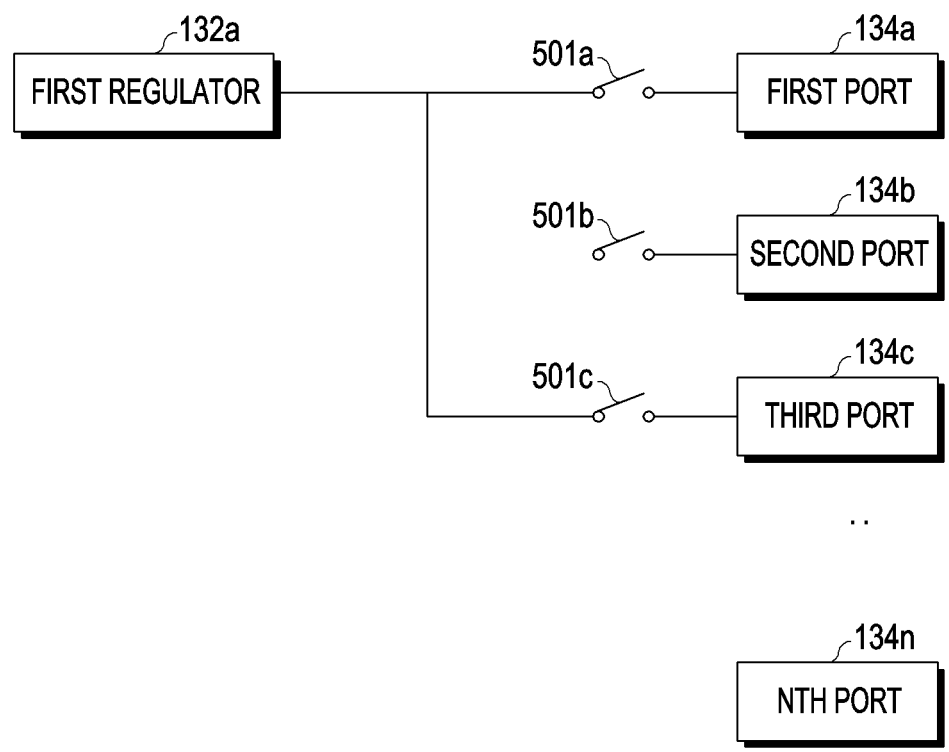
FIG. 5C is a view illustrating switches in a switching circuit according to an embodiment.

FIG. 5C illustrates a switching circuit according to an embodiment. According to an embodiment, the switching circuit 133 may include a plurality of switches 501a, 501b, and 501c for selectively connecting the first regulator 132a to connect to each of the plurality of ports 134a, 134b, and 134c. In contrast to FIG. 5A, three switches 501a, 501b, and 501c are connected to the first regulator 132a and, thus, the first regulator 132a is connectable to up to three ports 134a, 134b, and 134c. In other words, in the embodiment of FIG.

5C, the switching circuit 133 may be configured so that one regulator is connected to some of the plurality of ports, rather than all of the plurality of ports. Although not shown for ease of description, the switching circuit 133 may include a plurality of switches for selectively connecting at least one remaining regulator to some of the plurality of ports 134a, 134b, and 134c to 134n. Thus, the switching circuit 133 may include switches fewer than M*N.

The switch configuration of FIG. 5A, 5B, or 5C is merely an example, and it will be appreciated by one of ordinary skill in that art that any other various switch configurations may be adopted which may selectively connect each regulator included to at least one of a plurality of ports.

Figure 6A:
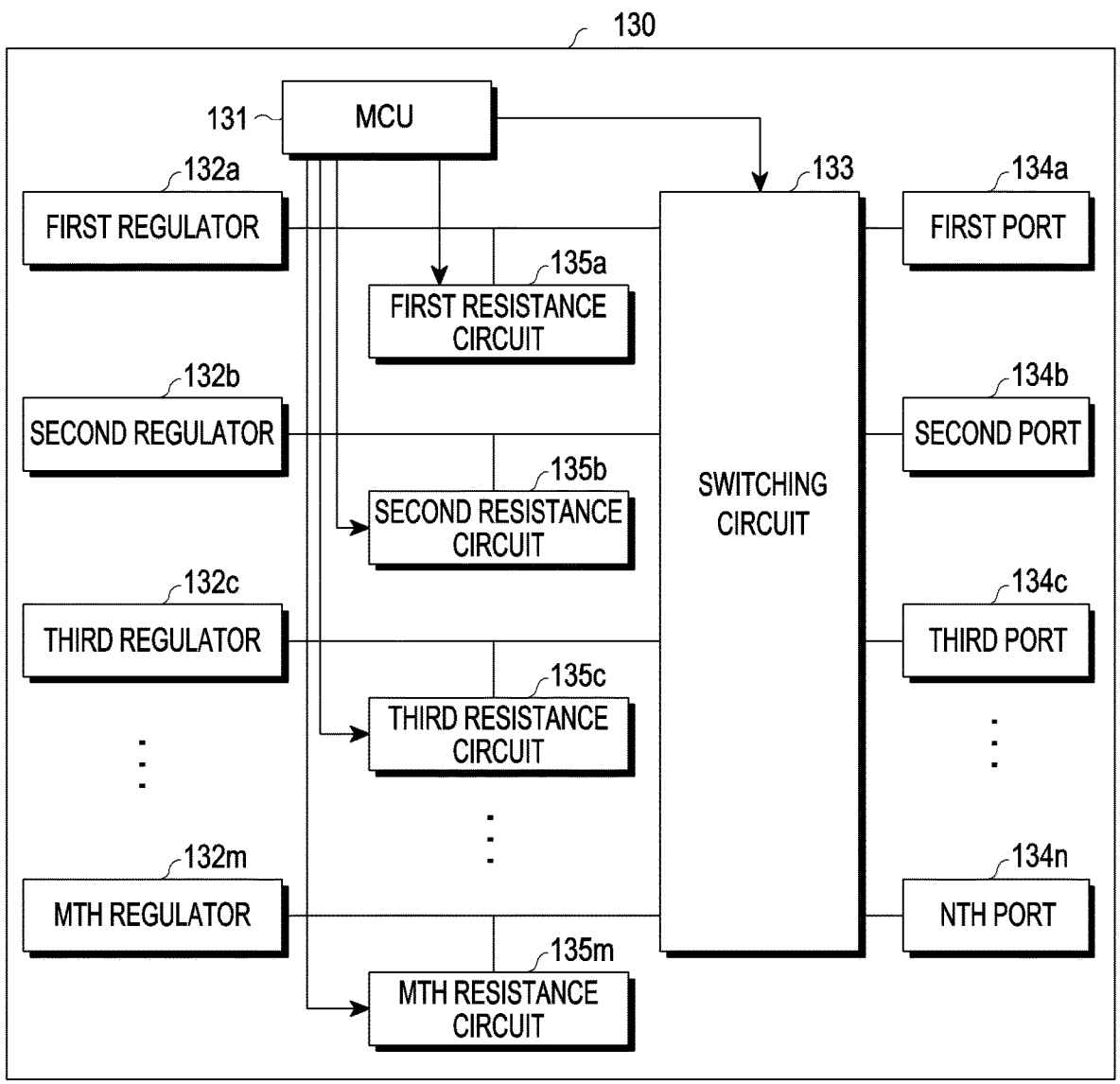
FIG. 6A is a block diagram illustrating a power management circuit according to an embodiment.

FIG. 6A is a block diagram illustrating a power management circuit according to an embodiment. The power management circuit 130 of FIG. 6A may be exchanged or replaced with the power management circuit 130 of FIG. 1A or 1B. When the power management circuit 130 of FIG. 6A is replaced with the power management circuit 130 of FIG. 1B, the MCU 131 of FIG. 6A may be omitted.

Figure 6B:
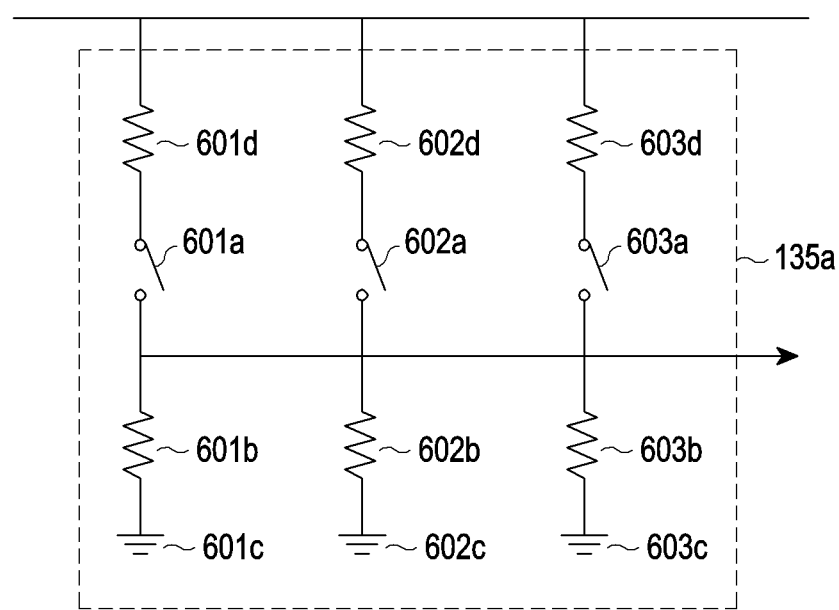
FIG. 6B is a circuit diagram of a first resistance circuit according to an embodiment.

Referring to FIG. 6A, according to an embodiment, the power management circuit 130 may further include a plurality of resistance circuits 135a, 135b, and 135c to 135m. The first resistance circuit 135a may connect to the first regulator 132a. FIG. 6B is a circuit diagram of the first resistance circuit 135a which is illustrated as an example of a resistance circuit according to an embodiment. Referring to FIG. 6B, the first resistance circuit 135a may include resistors 601b, 602b, and 603b connected to ground terminals 601c, 602c, and 603c. The resistors 601b, 602b, and 603b may be connected to the switches 601a, 602a, and 603a, respectively. The number and resistance of the resistors 601b, 602b, and 603b are not limited to specific values. The resistors 601d, 602d, and 603d may be connected between the switches 601a, 602a, and 603a and the output terminal of the first regulator 132a. The switches 601a, 602a, and 603a may be connected to the output terminal of the first regulator 132a. The switches 601a, 602a, and 603a being connected to the output terminal of the first regulator 132a is merely an example. It will be appreciated by one of ordinary skill in the art that where each of the switches 601a, 602a, and 603a is connected is not limited to the output terminal of the first regulator 132a as long as the voltage at the output terminal of the first regulator 132a is variable depending on the on/off state of each of the switches 601a, 602a, and 603a.

According to an embodiment, the voltage of power transferred to the switching circuit 133 may be determined depending on the connections of the switches 601a, 602a, and 603a. For example, there may be 8 different connections depending on the on/off state of the switches 601a, 602a, and 603a and, in each state, the voltage at the output terminal of the first regulator 132a may differ. For example, when the first load 140a requires a first magnitude of voltage, the connections of the switches 601a, 602a, and 603a may be controlled in a first state and, when the first load 140a requires a second magnitude of voltage, the connections of the switches 601a, 602a, and 603a may be controlled in a second state. The MCU 131 may identify the magnitude of voltage to be provided by the regulator and control at least some of the plurality of resistance circuits 135a, 135b, and 135c to 135m so that the magnitude of voltage may be provided.

According to an embodiment, the output voltage of the plurality of regulators 132a, 132b, and 132c to 132m may be controlled by software, firmware, or the like. The plurality of regulators 132a, 132b, and 132c to 132m may adjust the magnitude of output voltage based on a control signal from the outside. For example, the electronic device 101 (e.g., at least one of the processor 120 or the MCU 131) may transfer a control signal for adjusting the magnitude of voltage output from at least one of the plurality of regulators 132a, 132b, and 132c to 132m, and the regulator receiving the control signal may adjust the magnitude of output voltage based on the control signal. In this case, the power management circuit 130 may be implemented not to include a feedback resistance circuit (e.g., the plurality of resistance circuits 135a, 135b, and 135c to 135m).

Figure 7:
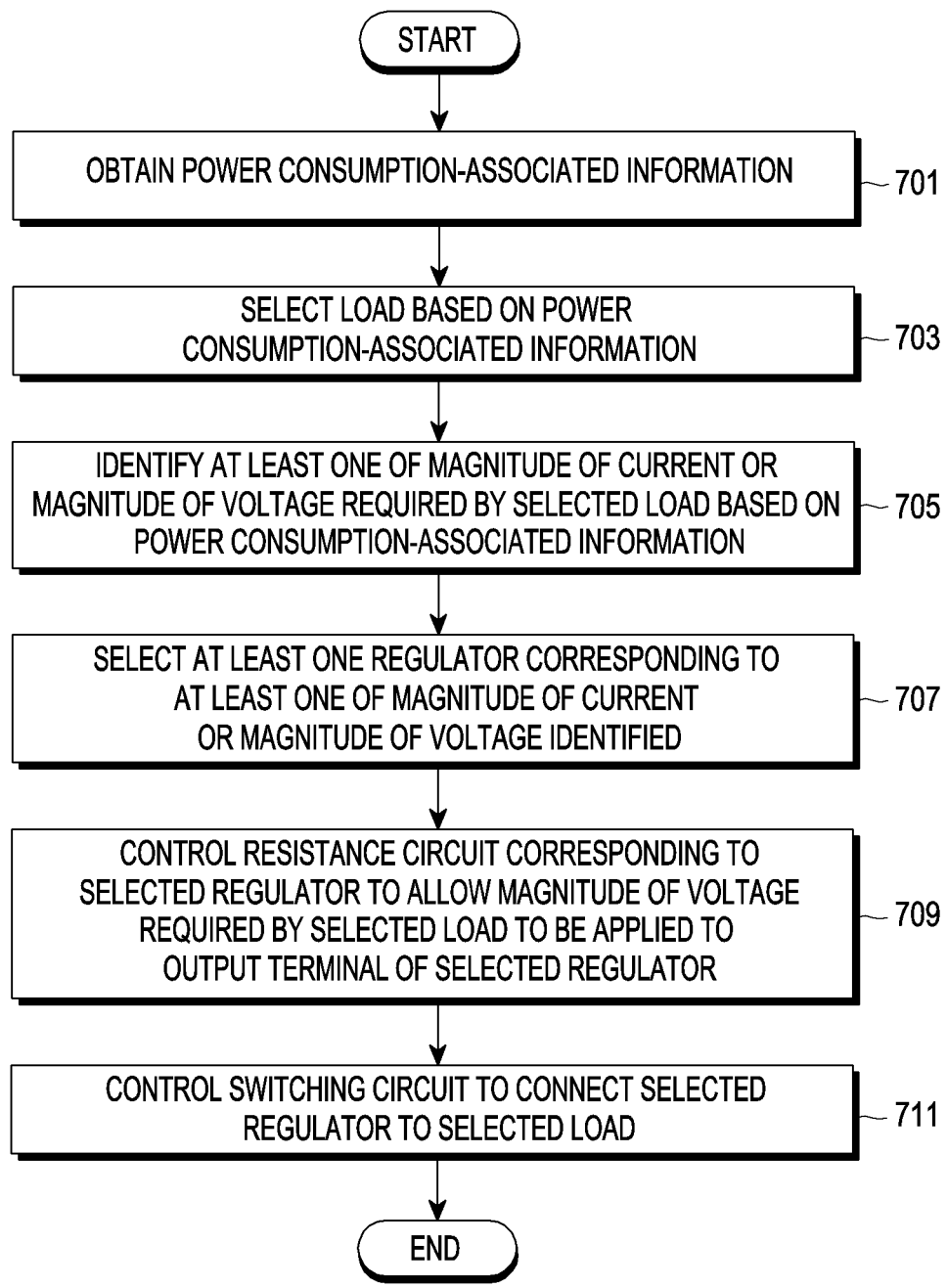
FIG. 7 is a flowchart illustrating a method for operating an electronic device according to an embodiment.

FIG. 7 is a flowchart illustrating a method for operating an electronic device according to an embodiment of the disclosure. The operations of FIG. 7 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, in operation 701, the electronic device 101 (e.g., at least one of the processor 120 or the MCU 131) may obtain power consumption-associated information. In operation 703, the electronic device 101 (e.g., at least one of the processor 120 or the MCU 131) may select a load based on the power consumption-associated information. In operation 705, the electronic device 101 (e.g., at least one of the processor 120 or the MCU 131) may identify at least one of the magnitude of current or magnitude of voltage required by the load selected based on the power consumption-associated information. In operation 707, the electronic device 101 (e.g., at least one of the processor 120 or the MCU 131) may select at least one regulator corresponding to at least one identified magnitude of current or magnitude of voltage. In operation 709, the electronic device 101 (e.g., at least one of the processor 120 or the MCU 131) may control the resistance circuit corresponding to the selected regulator so that the magnitude of voltage required by the selected load is applied to the output terminal of the selected regulator. For example, when the first load 140a requires a voltage of 5V, and the first regulator 132a is determined to connect to the first load 140a, the first resistance circuit 135a may be controlled so that the voltage at the output terminal of the first regulator 132a is 5V. In operation 711, the electronic device 101 may control the switching circuit so that the selected regulator connects to the selected load.

Figure 8A:
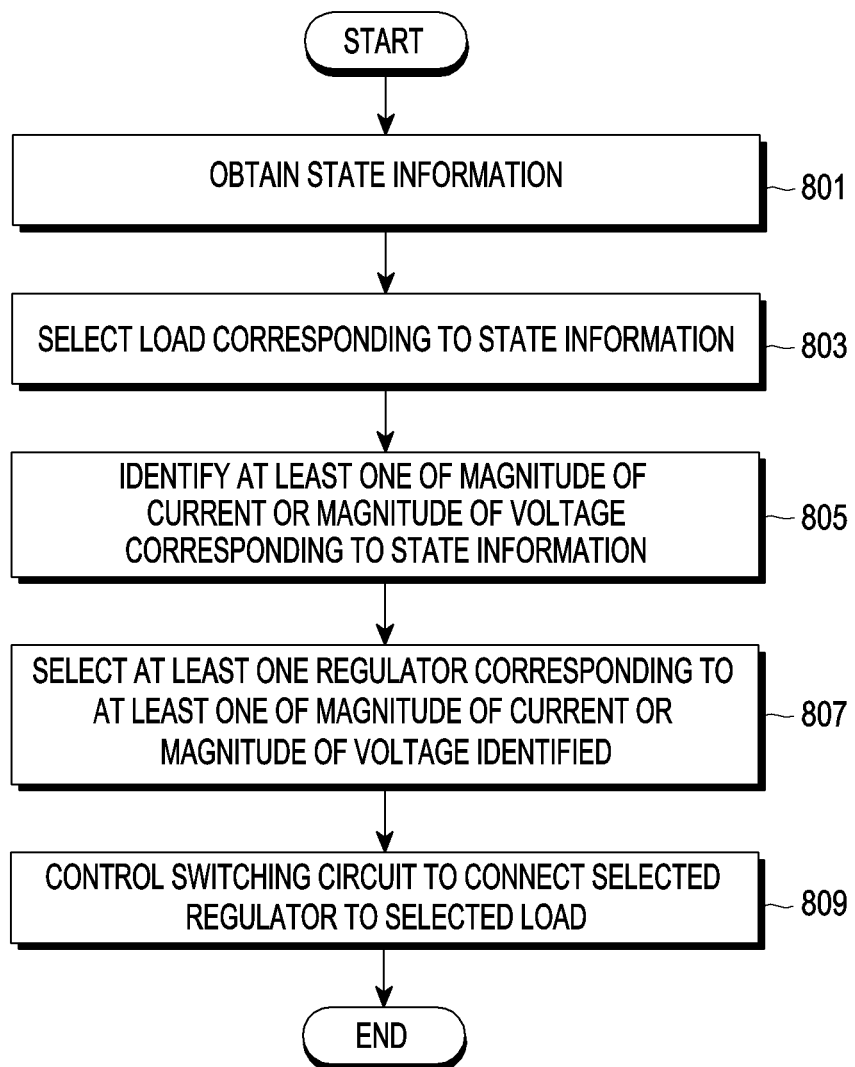
FIG. 8A is a flowchart illustrating a method for operating an electronic device according to an embodiment.

FIG. 8A is a flowchart illustrating a method for operating an electronic device according to an embodiment. The operations of FIG. 8A may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 or the MCU 131) may obtain state information for the electronic device 101 in operation 801. For example, the MCU 131 of the power management circuit 130 may receive the state information from the processor 120 which is positioned outside the power management circuit 130. For example, the processor 120 may determine an operation to be performed and identify state information corresponding thereto. Or, the processor 120 may directly identify the state information. A relatively small magnitude of state information is transmitted from the processor 120 to the MCU 131 so that low-latency power management may be possible. In operation 803, the electronic device 101, e.g., the MCU 131, may select the load corresponding to the state information. For example, when the state information indicates a moving state, the electronic device 101 may select a load, e.g., a driving circuit, corresponding to the moving state. With the need for performing communication, computation, and sensing even while on the move, the electronic device 101 may also select a communication circuit, processor, or sensor. The electronic device 101 may store a load corresponding to each piece of state information. The electronic device 101 may also store information for power required by the load for each piece of state information. For example, the current required by the driving circuit in a high-speed moving mode may differ from the current required by the driving circuit in a low-speed moving mode. Table 1 shows examples of state information managed by the electronic device 101 according to an embodiment.

TABLE 1

| State information identifier | Description | Load | Magnitude of current | Magnitude of voltage |
|---|---|---|---|---|
| 1 | low-speed moving state | driving circuit | 10 A | 15 V |
|  |  | communication circuit | 1.5 A | 5 V |
|  |  | processor | 3.0 A | 5 V |
|  |  | proximity sensor | 0.5 A | 5 V |
| 2 | high-speed moving state | driving circuit | 25 A | 15 V |
|  |  | communication circuit | 1.5 A | 5 V |
|  |  | processor | 3.0 A | 5 V |
|  |  | proximity sensor | 0.5 A | 5 V |
| 3 | voice output state | microphone | 3.0 A | 5 V |
|  |  | communication circuit | 1.5 A | 5 V |
|  |  | processor | 3.0 A | 5 V |
|  |  | camera | 0.5 A | 5 V |
| 4 | idle state | communication circuit | 1.0 A | 5 V |
|  |  | processor | 1.0 A | 5 V |

According to an embodiment, the MCU 131 may receive state information indicating the low-speed moving state from the processor 120. For example, the MCU 131 may receive a state information identifier of "1" from the processor 120, e.g., external processor. The MCU 131 may identify the low-speed moving state which corresponds to the state information identifier of "1" by referring to Table 1. The MCU 131 may determine that a load to be driven is the driving circuit, communication circuit, processor, or proximity sensor by referring to Table 1 and may identify the magnitude of current or magnitude of voltage required by each load. According to an embodiment, the MCU 131 may receive a state information identifier (e.g., a number such as 1, 2, 3, or 4) and identify information corresponding to the state information identifier. The MCU 131 may directly receive information corresponding to the state information identifier. The MCU 131 may receive at least one or more of the pieces of information (e.g., state information identifier, description, load, magnitude of current, or magnitude of voltage) set forth in Table 1 and, based on the received information, the MCU 131 may identify a load to be driven and the magnitude of current or magnitude of voltage required by the load.

According to an embodiment, the MCU 131 may receive one or more state information identifiers. For example, the MCU 131 may receive the identifier "1" which corresponds to the low-speed moving state. The MCU 131 may receive the identifier "1" which corresponds to the low-speed moving state and the identifier "3" which corresponds to the voice output state. For example, the electronic device 101 (e.g., the processor 120) may be operated to output a voice while moving at low speed in which case the processor 120 may transfer a plurality of identifiers (e.g., "1" and "3") to the MCU 131. Upon receiving the plurality of identifiers, the MCU 131 may identify the loads corresponding to the plurality of identifiers and the magnitude of current or magnitude of voltage per load.

According to an embodiment, the electronic device 101 may determine connections between the regulators and the plurality of loads, e.g., the driving circuit, communication circuit, processor, and proximity sensor, so that the selected regulator meets a designated efficiency condition. The MCU 131 may control the switching circuit 133 to connect the selected regulator to a plurality of loads. The MCU 131 may drive and control the regulator to transfer power to the load. The processor 120 may transfer control information to each load, and the load may be operated according to the received control information. Although the same load is used in both the high-speed moving state and low-speed moving state as shown in Table 1, the magnitude of current and/or magnitude of voltage required by at least some (e.g., the driving circuit) among the loads may differ. In the voice output state, different loads may be used from those in the high-speed moving state as shown in Table 1. As shown in Table 1, at least some loads (e.g., the processor or communication circuit) may be operated in the idle state, and the other loads may be turned off.

As set forth above, in operation 805, the electronic device 101 may identify at least one of the magnitude of current or magnitude of voltage per load corresponding to the state information. In operation 807, the electronic device 101 may select at least one regulator corresponding to at least one identified magnitude of current or magnitude of voltage. In operation 809, the electronic device 101 may control the switching circuit so that the selected regulator connects to the selected load. Meanwhile, it will be appreciated by one of ordinary skill in the art that the load per piece of state information, magnitude of current, and magnitude of voltage of Table 1 are merely an example.

As set forth above, the electronic device 101 may operate an idle mode for each load. Further, the electronic device 101 may operate various modes (e.g., an off mode, sleep mode (or inactive mode), or active mode), as well as the idle mode per load. By operating the modes, power consumption may be reduced as compared with when no mode operation is performed. Further, the electronic device 101 may additionally select a regulator and make a regulator connection. Thus, power consumption may further be reduced.

Figure 8B:
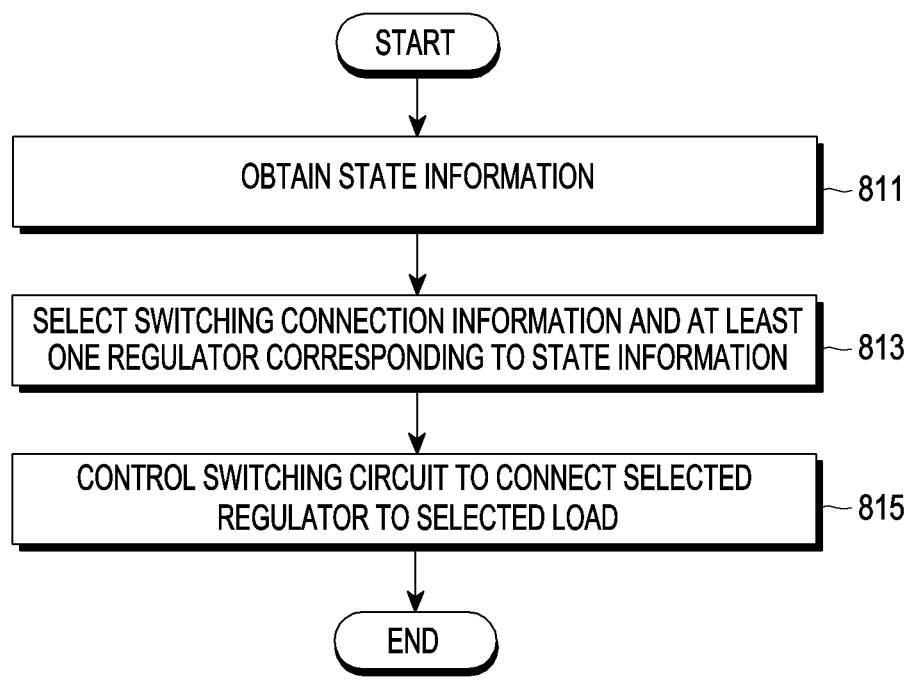
FIG. 8B is a flowchart illustrating a method for operating an electronic device according to an embodiment.

FIG. 8B is a flowchart illustrating a method for operating an electronic device according to an embodiment. The operations of FIG. 8B may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, in operation 811, the electronic device 101 (e.g., at least one of the processor 120 or the MCU 131) may obtain state information. For example, the MCU 131 of the power management circuit 130 may obtain state information from the processor 120. In operation 813, the electronic device 101, e.g., the MCU 131, may select switching connection information and at least one regulator corresponding to the state information. In operation 815, the electronic device 101 may control the switching circuit so that the selected regulator connects to the selected load.

For example, the MCU 131 may refer to reference information as shown in Table 2.

TABLE 2

| State information identifier | Description | regulator | regulator current control information | regulator voltage control information | switch on/off information |
|---|---|---|---|---|---|
| 1 | low-speed moving state | first regulator | 5 A | 15 V | first switch: ON, second switch: ON, third switch: OFF, fourth switch: ON, fifth switch: OFF, |
| | | second regulator | 5 A | 15 V | sixth switch: ON, seventh switch: OFF, eighth switch: OFF, ninth switch: OFF, |
| | | third regulator | 5 A | 5 V | tenth switch: OFF, eleventh switch: OFF, twelfth switch: OFF |
| 2 | high-speed moving state | first regulator | 5 A | 15 V | first switch: ON, |
| | | second regulator | 5 A | 15 V | second switch: ON, |
| | | third regulator | 5 A | 15 V | third switch: OFF, |
| | | fourth regulator | 5 A | 15 V | fourth switch: ON, fifth switch: OFF, sixth switch: ON, |
| | | fifth regulator | 5 A | 15 V | seventh switch: OFF, eighth switch: OFF, ninth switch: ON, |
| | | sixth regulator | 5 A | 5 V | tenth switch: ON, eleventh switch: ON, twelfth switch: OFF |

According to an embodiment, the MCU 131 may receive state information indicating the low-speed moving state from the processor 120. For example, the MCU 131 may receive a state information identifier of "1" from the processor 120. The MCU 131 may identify the low-speed moving state which corresponds to the state information identifier of "1" by referring to Table 2. Further, the MCU 131 may control the first regulator and the second regulator to output a power of 5 A and 15V and the third regulator to output a power of 5 A and 5V by referring to Table 2. The MCU 131 may control the on/off state of the switches in the switching circuit 133 based on the identified switch on/off state, so that the first regulator to the third regulator may provide a current of 10 A to the driving circuit, a current of 1.5 A to the communication circuit, a current of 3.0 A to the processor 120, and a current of 0.5 A to the proximity sensor. Upon receiving the state information indicating, e.g., the high-speed moving speed, the MCU 131 may control the first regulator, the second regulator, the third regulator, the fourth regulator, and the fifth regulator each to output a power of 5 A and 15V and control the sixth regulator to output a power of 5 A and 5V. The MCU 131 may control the on/off state of the switches in the switching circuit 133 based on the identified switch on/off state, so that the first regulator to the sixth regulator may provide a current of 25 A to the driving circuit, a current of 1.5 A to the communication circuit, a current of 3.0 A to the processor 120, and a current of 0.5 A to the proximity sensor. Although the low-speed moving state and the high-speed moving state are described with reference to Table 2 for ease of description, the electronic device 101 may store and reference information corresponding to various states.

According to an embodiment, the MCU 131 may receive a state information identifier (e.g., a number such as 1 or 2) and identify information corresponding to the state information identifier. The MCU 131 may directly receive information corresponding to the state information identifier. The MCU 131 may receive at least one or more of the pieces of information (e.g., state information identifier, description, regulator, regulator current control information, regulator voltage control information, or switch on/off information) set forth in Table 2 and, based on the received information, the MCU 131 may identify a load to be driven and the magnitude of current or magnitude of voltage required by the load. According to an embodiment, the MCU 131 may receive a state information identifier (e.g., the number "3") corresponding to a plurality of pieces of state information (e.g., low-speed moving state and voice output state) and may identify the regulator, regulator current control information, regulator voltage control information, and switch on/off information corresponding to the state information identifier.

Figure 9:
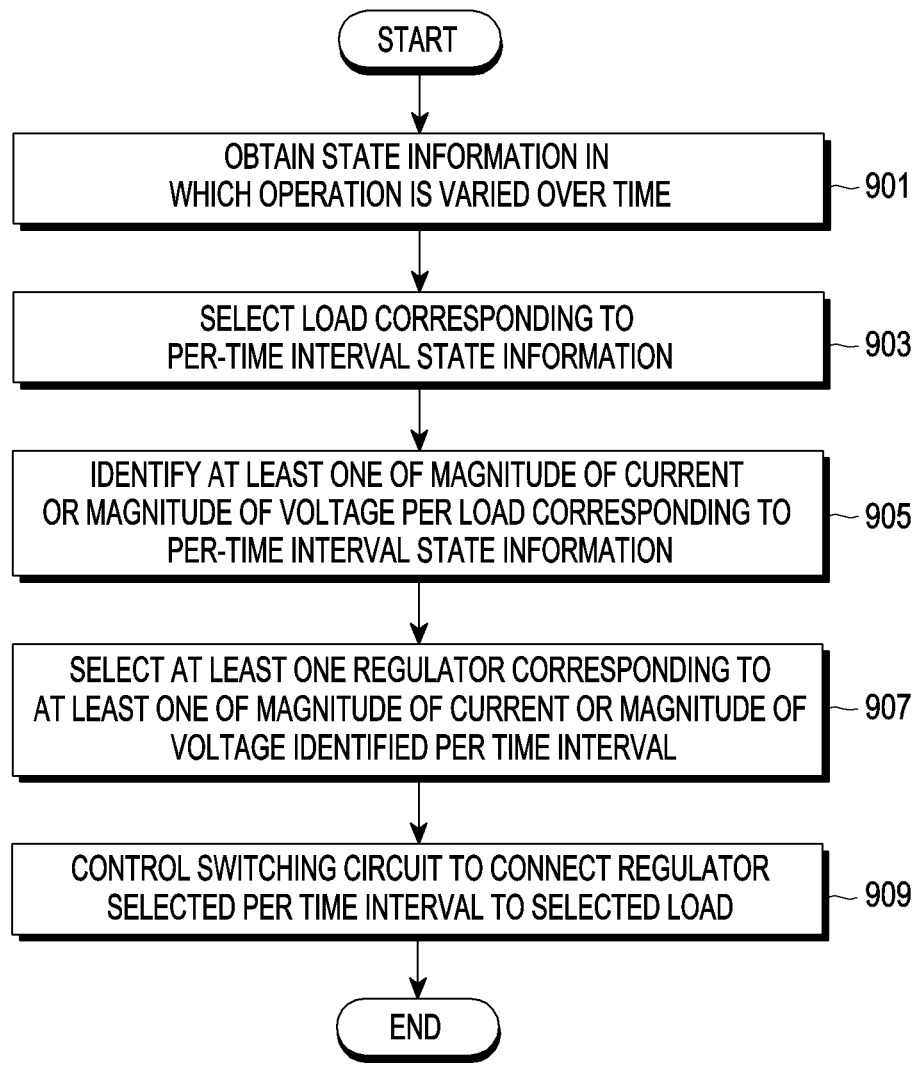
FIG. 9 is a flowchart illustrating a method for operating an electronic device according to an embodiment.
Figure 10:
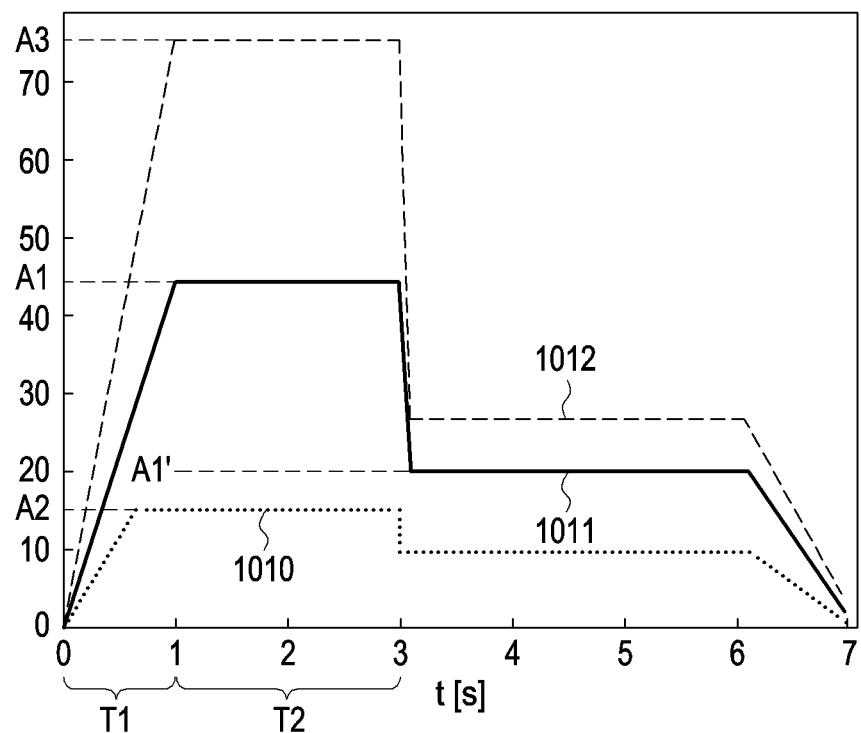
FIG. 10 is a graph illustrating the magnitude of current required by any load per time interval according to an embodiment.

FIG. 9 is a flowchart illustrating a method for operating an electronic device according to an embodiment. The operations of FIG. 9 may be performed by the processor 120 alone, which is positioned outside the power management circuit 130, or the MCU 131 alone, which is positioned in the power management circuit 130 or may be performed by the MCU 131 in the power management circuit 130 and the processor 120. An embodiment is described in detail with reference to FIG. 9 along with FIG. 10. FIG. 10 is a graph illustrating the magnitude of current required by any load per time interval according to an embodiment.

According to an embodiment, in operation 901, the electronic device 101, e.g., the MCU 131 of the power management circuit 130, may obtain state information in which the operation is varied over time. For example, the state information may indicate the high-speed moving state. Referring to FIG. 10, in the high-speed moving state, the driving circuit (e.g., a motor) may require that the power be increased to a magnitude of A1 during time T1. This is attributed to the fact that moving at the initial stop time requires more force since the coefficient of static friction when the electronic device 101 is stationary is larger than the coefficient of kinetic friction when the electronic device 101 is moving. After starting to move, the driving circuit may require a current of A1' and the magnitude of current required to stop may be reduced from A1' to 0, as shown by a graph 1011. On the other hand, as shown by a graph 1010, in the low-speed moving state, the driving circuit (e.g., a motor) may require that the power be increased to a magnitude of A2 during time T1. As shown by a graph 1012, if high-speed moving is required when the electronic device 101 is relatively heavy, the driving circuit (e.g., a motor) may require that the power be increased to a magnitude of A3 during time T1. The electronic device 101 may identify the magnitude of current required by the load based on the speed and/or weight of the present load.

In operation 903, the electronic device 101 may select the load corresponding to the per-time interval state information. In operation 905, the electronic device 101 may identify at least one of the magnitude of current or magnitude of voltage per load corresponding to the per-time interval state information. In operation 907, the electronic device 101 may select at least one regulator corresponding to the identified magnitude of current or magnitude of voltage per time interval. For example, the electronic device 101 may determine the regulator and the connection between the regulator and the driving circuit so that the driving circuit may receive a power of A1 during period T1 of FIG. 10. The electronic device 101 may determine the regulator and the connection between the regulator and the driving circuit so that the driving circuit may receive a current of A1' during period T2 of FIG. 10. In operation 909, the electronic device 101 may control the switching circuit so that the regulator selected per time interval connects to the selected load during corresponding time interval. The electronic device 101 may drive the regulator. Thus, the driving circuit of the electronic device 101 may receive a current of A1 during period T1 and receive a current of A1' during period T2. Since the magnitude of current required by the driving circuit may be varied per time interval, the selected regulator and/or connection of the regulator to the load may also be varied per time interval. According to an implementation, the MCU 131 may determine the regulator and connection of regulator so that the current whose magnitude increases as shown in FIG. 10, rather than a fixed current, during period T1 is applied to the driving circuit. In operation 909, the electronic device 101 may control the switching circuit so that the selected regulator per time interval connects to the selected load. The electronic device 101 may drive the regulator.

Determining the current based on the weight of the electronic device 101 is merely an example. The electronic device 101 may determine the magnitude of current and/or magnitude of voltage required by each load further using various pieces of additional information. The electronic device 101 may further split the state information according to the additional information and manage the same.

Figure 11:
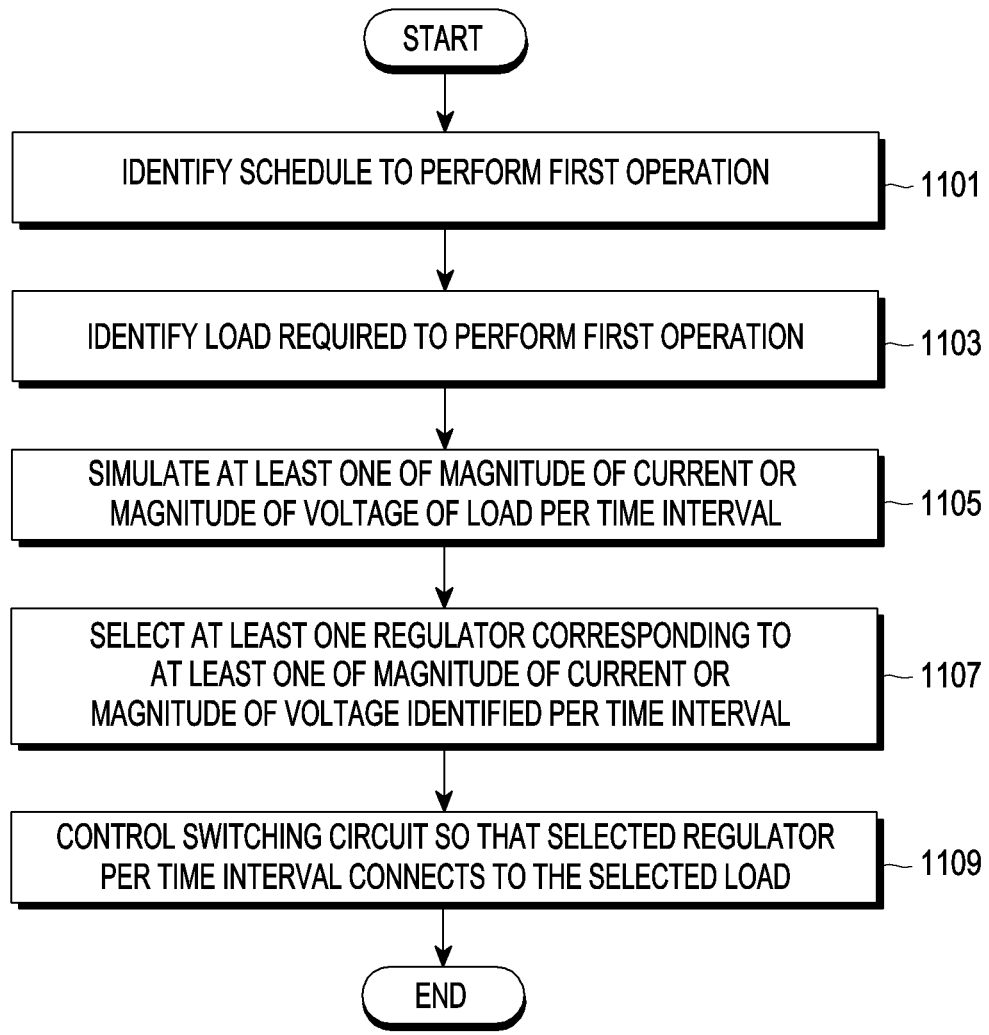
FIG. 11 is a flowchart illustrating a method for operating an electronic device according to an embodiment.

FIG. 11 is a flowchart illustrating a method for operating an electronic device according to an embodiment. The operations of FIG. 11 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 or the MCU 131) may identify a schedule to perform a first operation in operation 1101. In operation 1103, the electronic device 101 may identify the load required to perform the first operation. In operation 1105, the electronic device 101 may simulate at least one of the magnitude of current or magnitude of voltage of the load per time interval. The electronic device 101 may determine an operation to be performed and simulate at least one of the magnitude of current or magnitude of voltage of the load per time interval based on information obtained by sensing the ambient context. For example, the electronic device 101 may determine to move 3m forward. The electronic device 101 may identify the slope for the forward direction and identify the magnitude of current required by the driving circuit based on the slope. For example, a different magnitude of current may be required depending on the slope, and the electronic device 101 may identify the magnitude of current required. The electronic device 101 may identify the magnitude of current required further using the present weight of the electronic device 101. Further, the electronic device 101 may determine a path according to a result of external sensing and identify the magnitude of current required based on the feature of the path. As set forth above, the electronic device 101 may perform simulation based on various pieces of information. In operation 1107, the electronic device 101 may select at least one regulator corresponding to the identified magnitude of current or magnitude of voltage per time interval. In operation 1109, the electronic device 101 may control the switching circuit so that the selected regulator per time interval connects to the selected load.

Figure 12:
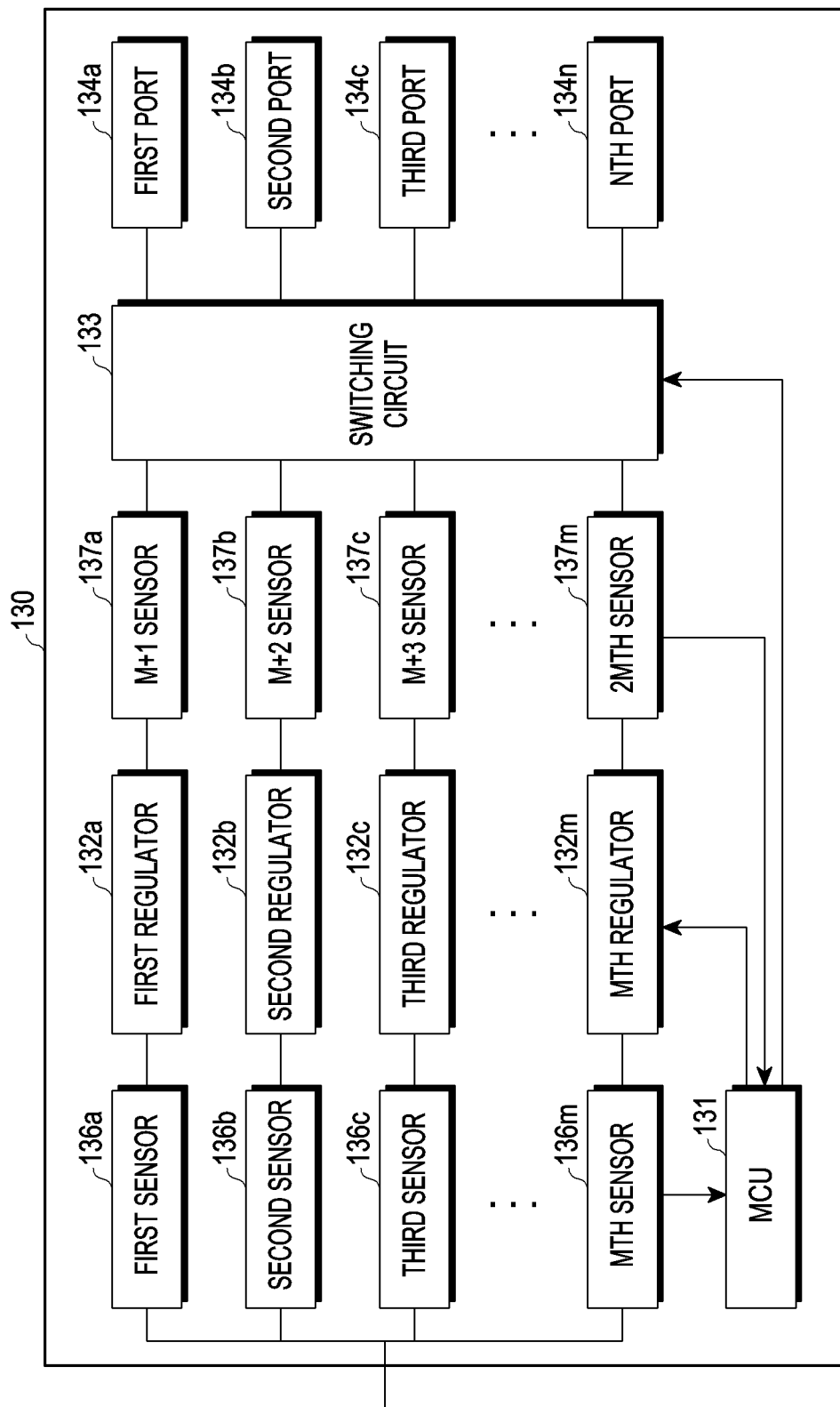
FIG. 12 is a block diagram illustrating a power management circuit according to an embodiment.

FIG. 12 is a block diagram illustrating a power management circuit according to an embodiment. The power management circuit 130 of FIG. 12 may be exchanged or replaced with the power management circuit 130 of FIG. 1A or 1B. When the power management circuit 130 of FIG. 12 is replaced with the power management circuit 130 of FIG. 1B, the MCU 131 of FIG. 6A may be omitted.

According to an embodiment, the power management circuit 130 may further include a plurality of (e.g., M) input sensors 136a, 136b, and 136c to 136m, e.g., first sensors, respectively connected to the respective input terminals of the plurality of regulators 132a, 132b, and 132c to 132m, and a plurality of (e.g., M) output sensors 137a, 137b, and 137c to 137m, i.e., second sensors, as for example, (M+1) sensor, (M+2) sensor, and (M+3) to 2Mth sensor, respectively connected to the respective output terminals of the plurality of regulators 132a, 132b, and 132c to 132m. The plurality of input sensors 136a, 136b, and 136c to 136m, respectively, may sense at least one of the magnitude of current and/or magnitude of voltage at the respective input terminals of the plurality of regulators 132a, 132b, and 132c to 132m. The plurality of output sensors 137a, 137b, and 137c to 137m, respectively, may sense at least one of the magnitude of current and/or magnitude of voltage at the respective output terminals of the plurality of regulators 132a, 132b, and 132c to 132m. The plurality of input sensors 136a, 136b, and 136c to 136m and the plurality of output sensors 137a, 137b, and 137c to 137m may transfer the sensed information to the MCU 131. Although FIG. 12 illustrates that the MCU 131 receives sensing information from the Mth sensor 136m and the 2Mth sensor 137m and outputs control information to the Mth regulator 132m and the switching circuit 133, this is solely for illustration purposes. It will be readily appreciated by one of ordinary skill in the art that the MCU 131 may receive sensing information from other input sensors 136a, 136b, and 136c, and other output sensors 137a, 137b, and 137c, and output the control information to other regulators 132a, 132b, and 132c. When the power management circuit 130 does not include the MCU 131, the plurality of input sensors 136a, 136b, and 136c to 136m and the plurality of output sensors 137a, 137b, and 137c to 137m may transfer the sensing information to the processor 120. The MCU 131 (or the processor 120) may identify the power conversion efficiency of the plurality of regulators 132a, 132b, and 132c to 132m based on the received information. The power conversion efficiency may be identified based on the magnitude of current at the output terminal relative to the magnitude of current at the input terminal, but identifying the power conversion efficiency is not limited to a specific scheme or way.

Figure 13:
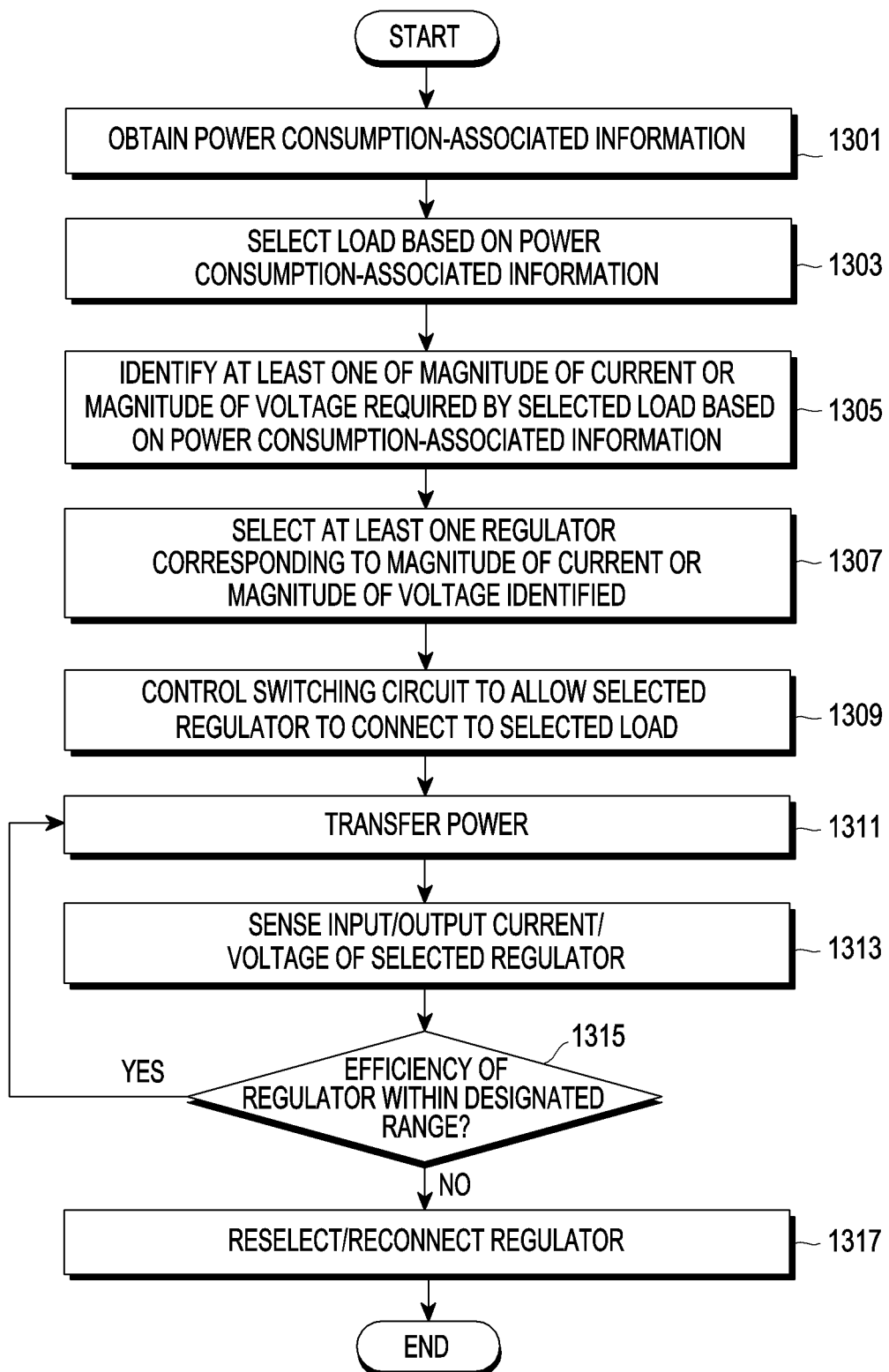
FIG. 13 is a flowchart illustrating a method for operating an electronic device according to an embodiment.

FIG. 13 is a flowchart illustrating a method for operating an electronic device according to an embodiment of the disclosure. The operations of FIG. 13 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, in operation 1301, the electronic device 101 (e.g., at least one of the processor 120 or the MCU 131) may obtain power consumption-associated information. In operation 1303, the electronic device 101 may select a load based on the power consumption-associated information. In operation 1305, the electronic device 101 may identify at least one of the magnitude of current or magnitude of voltage required by the load selected based on the power consumption-associated information. In operation 1307, the electronic device 101 may select at least one regulator corresponding to the identified magnitude of current or magnitude of voltage. In operation 1309, the electronic device 101 may control the switching circuit so that the selected regulator connects to the selected load. In operation 1311, the electronic device 101 may control the selected regulator to transfer power.

According to an embodiment, in operation 1313, the electronic device 101 may sense the input/output current/voltage of the selected regulator. As set forth above, the MCU 131 (or the processor 120) may receive sensing information from the plurality of input sensors 136a, 136b, and 136c to 136m and the plurality of output sensors 137a, 137b, and 137c to 137m. In operation 1315, the electronic device 101 may identify whether the efficiency of the regulator is within a designated range. The electronic device 101 may identify the power conversion efficiency of the regulator based on the voltage and/or current at the input terminal of each regulator and the voltage and/or current at the output terminal of each regulator. The electronic device 101 may identify whether the power conversion efficiency of the regulator identified based on the sensing information falls within the designated range. When the power conversion efficiency falls within the designated range (yes in operation 1315), the electronic device 101 may keep on transferring power based on the existing control parameter. Unless the power conversion efficiency falls within the designated range (no in operation 1315), the electronic device 101 may reselect and reconnect a regulator in operation 1317. The electronic device 101 may determine a connection of the reselected regulator to the load. The electronic device 101 may change the connection of the regulator to the load. The electronic device 101 may change regulators until the power conversion efficiency falls within the designated range. Upon failing to allow the power conversion efficiency to fall within the designated range even after changing regulators and regulator-load connections a designated number of times or more, the electronic device 101 may select the regulator and connection corresponding to the maximum power conversion efficiency among power conversion efficiencies identified.

Figure 14:
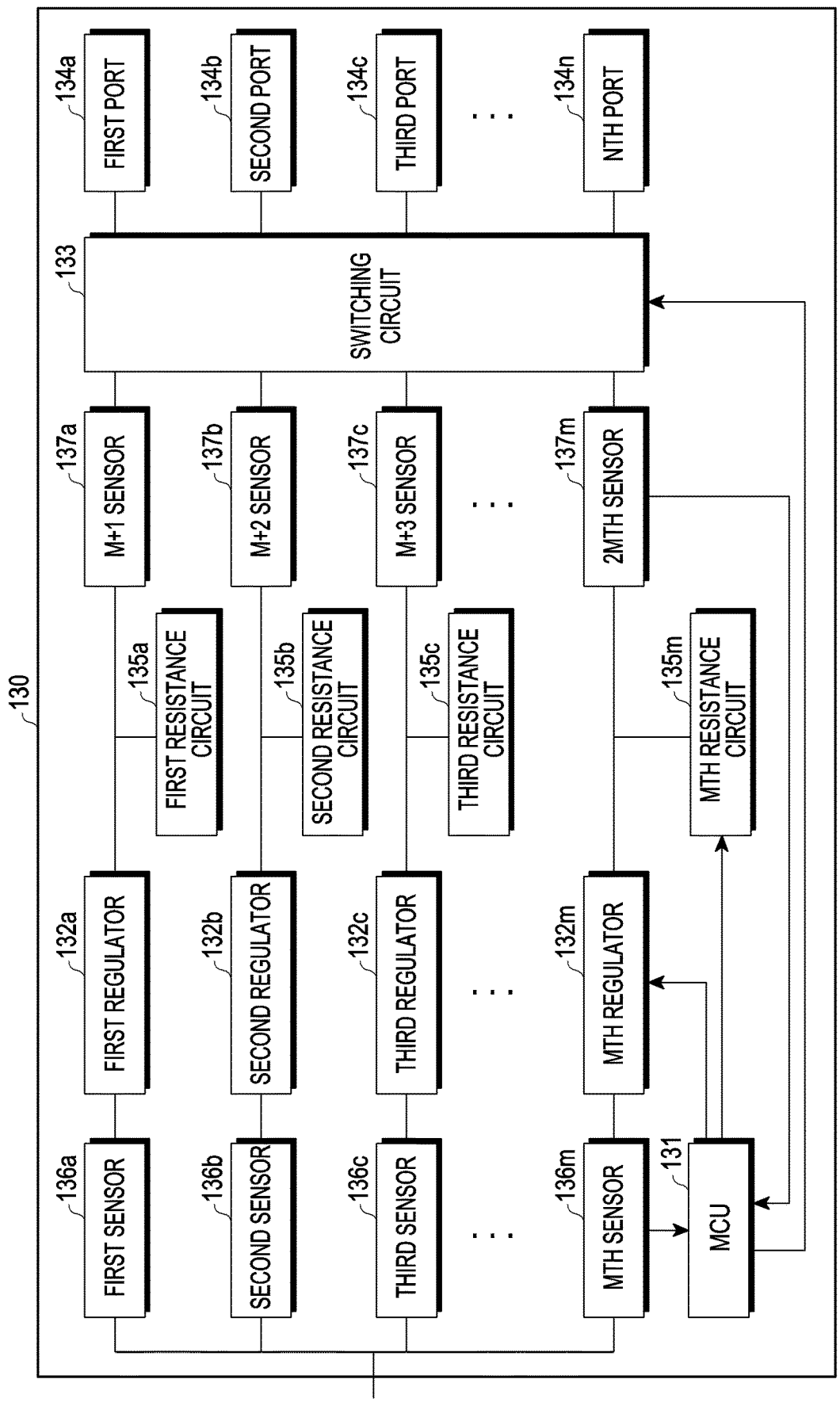
FIG. 14 is a block diagram illustrating a power management circuit according to an embodiment.

FIG. 14 is a block diagram illustrating a power management circuit according to an embodiment. The power management circuit 130 of FIG. 14 may be exchanged or replaced with the power management circuit 130 of FIG. 1A or 1B. When the power management circuit 130 of FIG. 14 is replaced with the power management circuit 130 of FIG. 1B, the MCU 131 of FIG. 6A may be omitted.

According to an embodiment, the power management circuit 130 may include a plurality of input sensors 136a, 136b, and 136c to 136m and a plurality of regulators 132a, 132b, and 132c to 132m respectively connected with the plurality of input sensors 136a, 136b, and 136c to 136m. A plurality of resistance circuits 135a, 135b, and 135c to 135m may be connected to the plurality of regulators 132a, 132b, and 132c to 132m, respectively, and a plurality of output sensors 137a, 137b, and 137c to 137m may be connected to the plurality of regulators 132a, 132b, and 132c to 132m, and a switching circuit 133 may be connected to the plurality of regulators 132a, 132b, and 132c to 132m. The switching circuit 133 may selectively connect at least some of the plurality of regulators 132a, 132b, and 132c to 132m to at least some of a plurality of ports 134a, 134b, and 134c to 134n. The MCU 131 may select at least some of the plurality of regulators 132a, 132b, and 132c to 132m based on at least some of pieces of sensing information from the plurality of input sensors 136a, 136b, and 136c to 136m or sensing information from the plurality of output sensors 137a, 137b, and 137c to 137m. The MCU 131 may control the switching circuit 133 to connect at least some of the plurality of regulators 132a, 132b, and 132c to 132m to at least some of the plurality of ports 134a, 134b, and 134c to 134n, determine the operation condition of the selected regulator, and control the selected regulator to operate under the operation condition. Further, the MCU 131 may control the resistance circuit connected with the selected regulator so that the output voltage of the selected regulator meets a corresponding voltage. Alternatively, at least some of the above-described operations of the MCU 131 may be performed by the processor 120 positioned outside the power management circuit 130.

Figure 15:
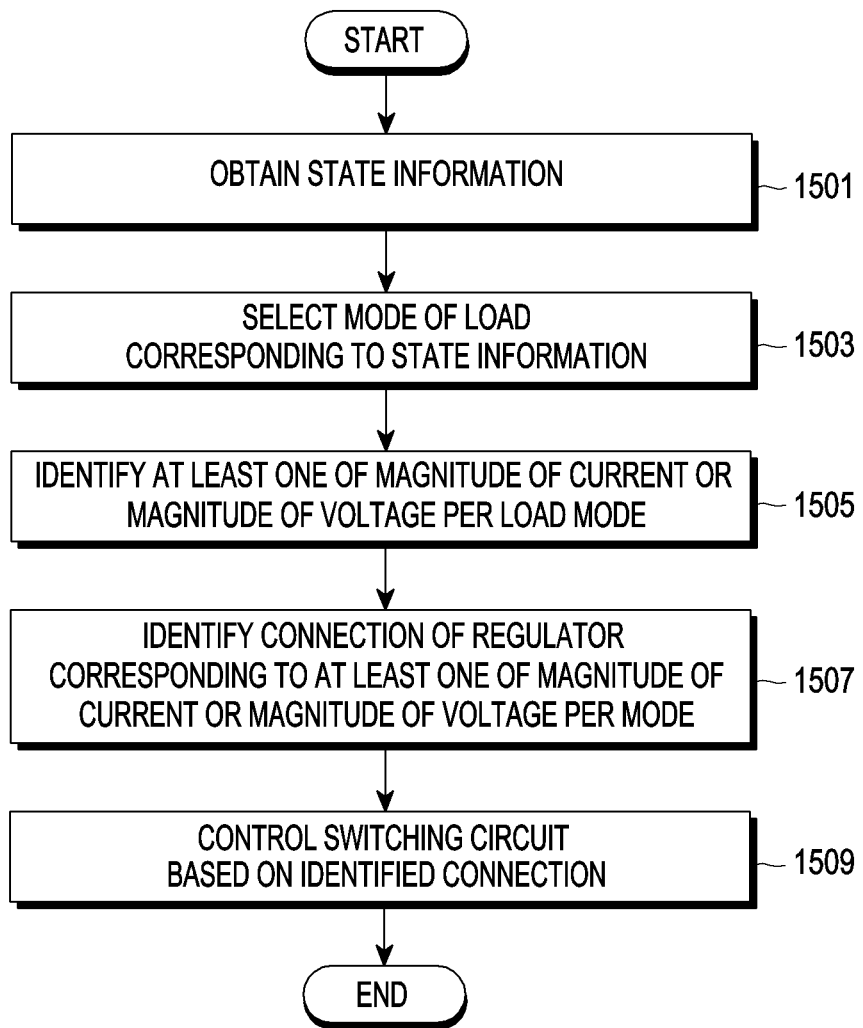
FIG. 15 is a flowchart illustrating a method for operating an electronic device according to an embodiment.

FIG. 15 is a flowchart illustrating a method for operating an electronic device according to an embodiment of the disclosure. The operations of FIG. 15 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 or the MCU 131 in the power management circuit 130) may obtain state information in operation 1501. In operation 1503, the electronic device 101 may select the mode of load corresponding to the state information. For example, the mode of the load may be any one of an idle mode, an off mode, a sleep mode (or inactive mode), or an active mode. The electronic device 101 may define and manage the mode of load per piece of state information. For example, in the state of obtaining a voice, the electronic device 101 may determine that the microphone is in the active mode and that the speaker is in the idle mode. Although the speaker is not used in the voice obtaining state, the speaker may be determined, in advance, to be in the idle state so as to output a voice response corresponding to an obtained voice. In operation 1505, the electronic device 101 may identify at least one of the magnitude of current or magnitude of voltage per mode of load. In operation 1507, the electronic device 101 may identify the connection of the regulator corresponding to at least one of the magnitude of current or magnitude of voltage per mode. In operation 1509, the electronic device 101 may control the switching circuit 133 based on the identified connection.

Figure 16:
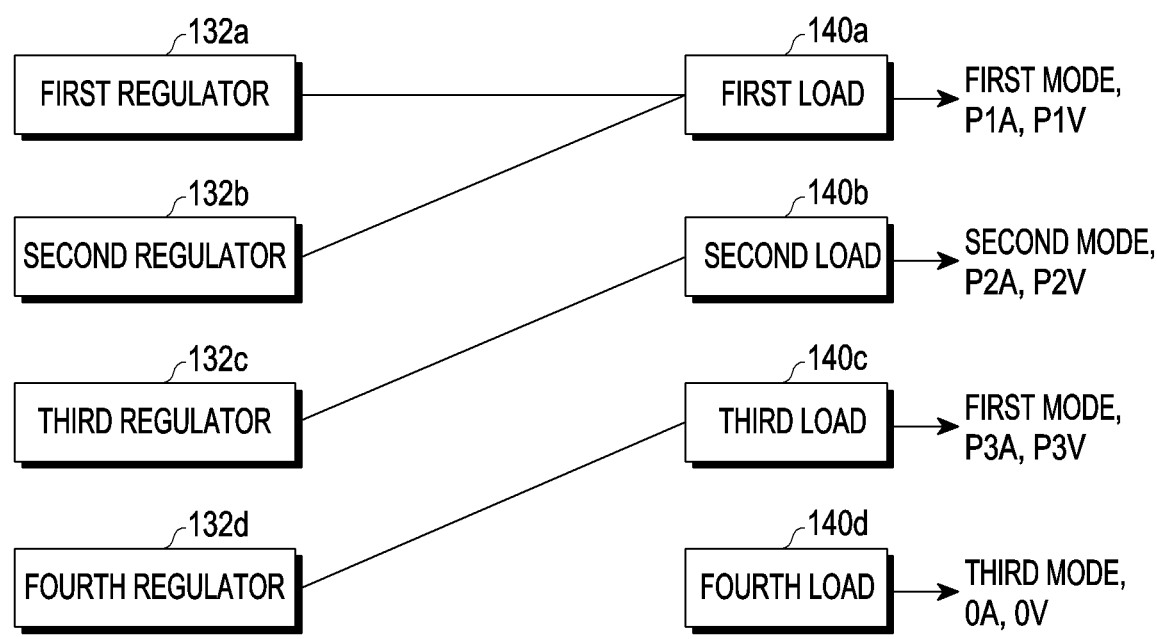
FIG. 16 is a view illustrating an example of selecting a regulator depending on the mode of a load and determining a connection according to an embodiment.

FIG. 16 is a view illustrating an example of selecting a regulator depending on the mode of a load and determining a connection according to an embodiment. FIG. 16 may illustrate an example of selecting at least one regulator and controlling the switching circuit in, e.g., operations 203, 205, and 207 of FIG. 2.

According to an embodiment, the electronic device 101 may identify first state information. For example, in the first state information, the electronic device 101 may identify that the first load 140*a* requires a current of P1 A and a voltage of P1 V as a first mode (e.g., active mode), the second load 140*b* requires a current of P2 A and a voltage of P2 V as a second mode (e.g., idle mode), the third load 140*c* requires a current of P3 A and a voltage of P3 V as the first mode (e.g., active mode), and the fourth load 140*d* requires a current of OA and a voltage of 0V as a third mode (e.g., off mode). The electronic device 101 may select at least one regulator 132*a*, 132*b*, 132*c*, and 132*d* so that the current and voltage required per mode may be provided to each of the plurality of loads 140*a*, 140*b*, and 140*c* requiring power. Further, the electronic device 101 may control the switching circuit 133 to connect the first regulator 132*a* and the second regulator 132*b* to the first load 140*a*, the third regulator 132*c* to connect to the second load 140*b*, and the fourth regulator 132*d* to connect to the third load 140*c* so that the current and voltage may be provided to the plurality of loads 140*a*, 140*b*, and 140*c* requiring power.

Figure 17:
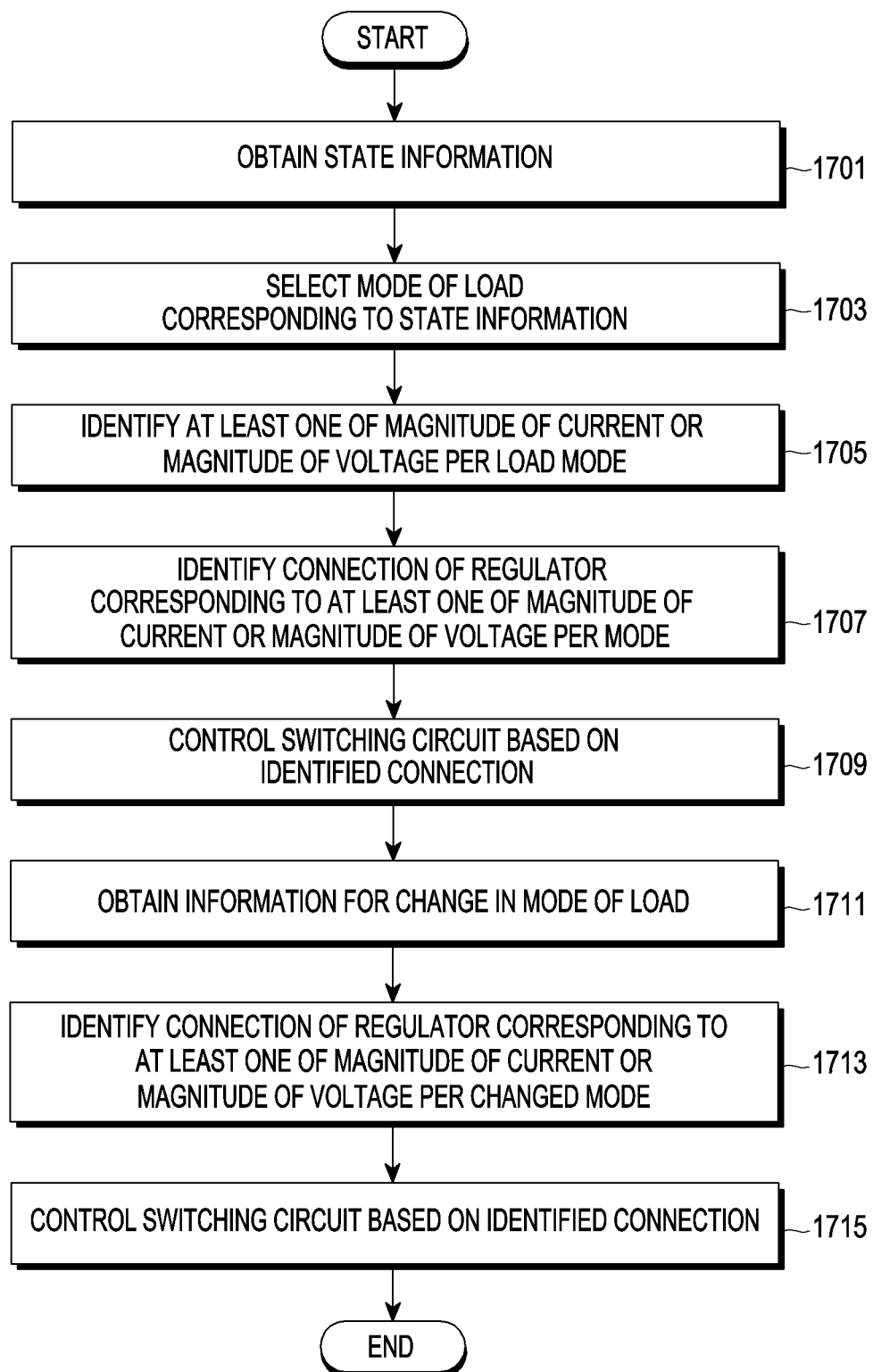
FIG. 17 is a flowchart illustrating a method for operating an electronic device according to an embodiment.

FIG. 17 is a flowchart illustrating a method for operating an electronic device according to an embodiment of the disclosure. The operations of FIG. 17 may be performed by the processor 120 alone, which is positioned outside the power management circuit 130, or the MCU 131 alone, which is positioned in the power management circuit 130 or may be performed by the MCU 131 in the power management circuit 130 and the processor 120. Among the operations of FIG. 17, those described above are briefly mentioned below.

According to an embodiment, in operation 1701, the electronic device 101 (e.g., at least one of the processor 120 or the MCU 131) may obtain state information. In operation 1703, the electronic device 101 may select the mode of load corresponding to the state information. In operation 1705, the electronic device 101 may identify at least one of the magnitude of current or magnitude of voltage per mode of load. In operation 1707, the electronic device 101 may identify the connection of the regulator corresponding to at least one of the magnitude of current or magnitude of voltage per mode. In operation 1709, the electronic device 101 may control the switching circuit based on the identified connection.

According to an embodiment, the electronic device 101 may obtain information for a change in the mode of load in operation 1711. For example, the electronic device 101 may identify that the mode of the second load 140*b* in FIG. 16 changes from the second mode (e.g., idle mode) to the first mode (e.g., active mode). The electronic device 101 may identify that in the first mode, the second load 140*b* requires, e.g., a current of P4 A and a voltage of P4 V. The electronic device 101 may reselect a regulator to provide the current and voltage to the second load 140*b* and determine connections between the reselected regulator and the plurality of loads 140*a*, 140*b*, and 140*c*. In operation 1713, the electronic device 101 may identify the connection of the regulator corresponding to at least one of the magnitude of current or magnitude of voltage per mode. In operation 1715, the electronic device 101 may control the switching circuit 133 based on the identified connection.

Figure 18:
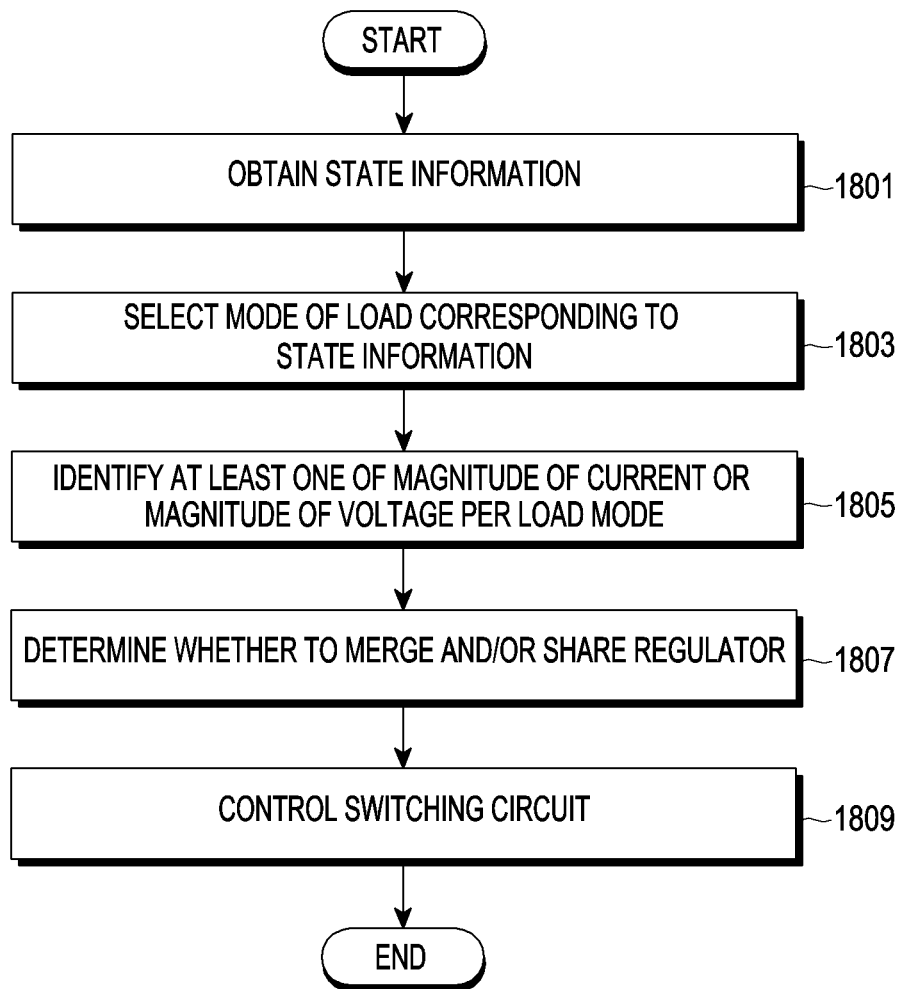
FIG. 18 is a flowchart illustrating a method for operating an electronic device according to an embodiment.
Figure 19:
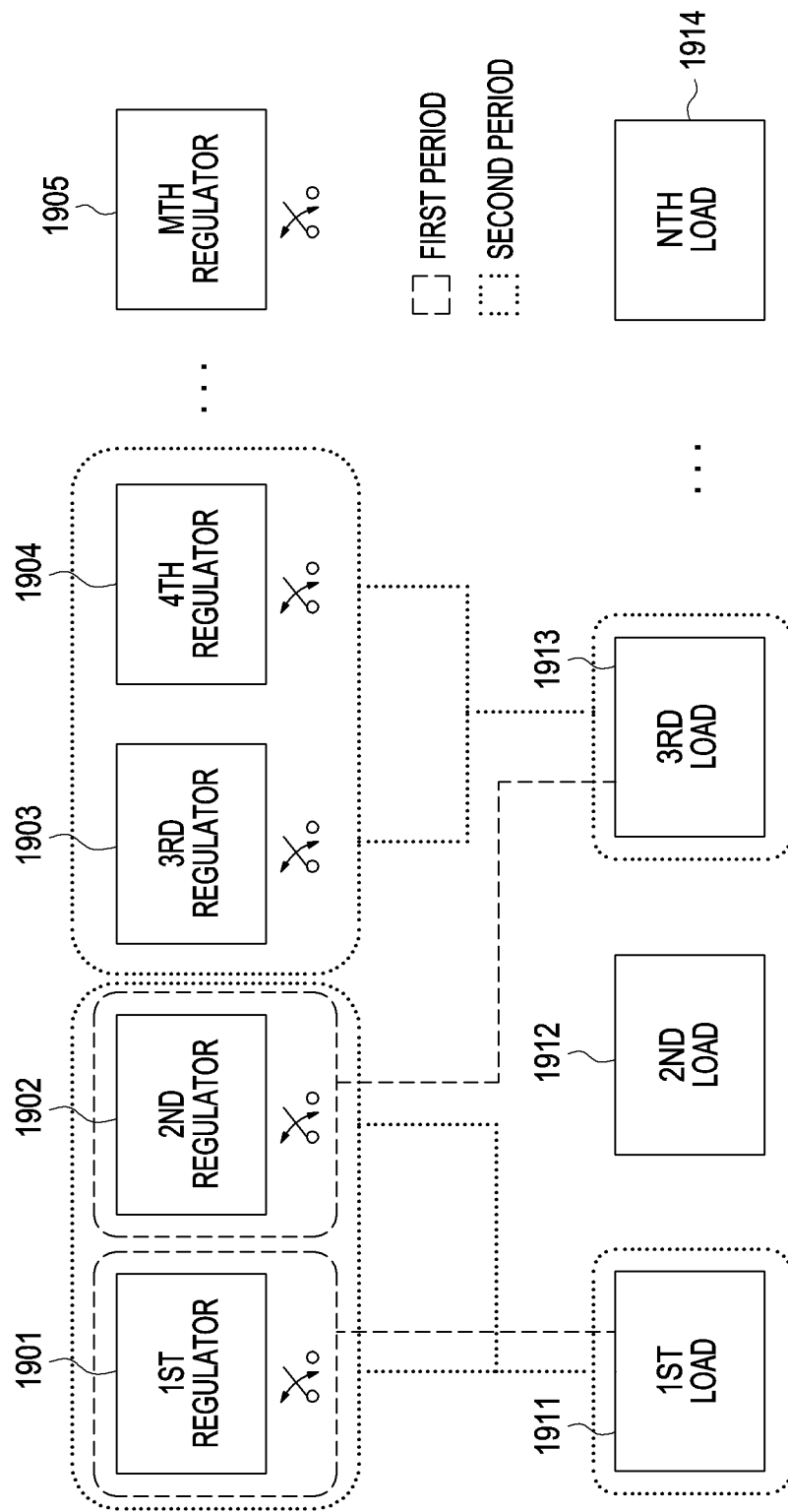
FIG. 19 is a view illustrating an example of merging regulators according to an embodiment.

FIG. 18 is a flowchart illustrating a method for operating an electronic device according to an embodiment. The operations of FIG. 18 may be performed by the processor 120 alone, which is positioned outside the power management circuit 130, or the MCU 131 alone, which is positioned in the power management circuit 130 or may be performed by the MCU 131 in the power management circuit 130 and the processor 120. The embodiment shown in FIG. 18 is described in greater detail with reference to FIG. 19. FIG. 19 is a view illustrating an example of merging regulators according to an embodiment. FIG. 19 may illustrate an example of selecting at least one regulator and controlling the switching circuit in, e.g., operations 203, 205, and 207 of FIG. 2.

According to an embodiment, the electronic device 101 (e.g., at least one of the processor 120 or the MCU 131) may obtain state information in operation 1801. In operation 1803, the electronic device 101 may select the mode of load corresponding to the state information. In operation 1805, the electronic device 101 may identify at least one of the magnitude of current or magnitude of voltage per mode of load. In operation 1807, the electronic device 101 may determine whether to merge and/or share the regulators. In operation 1809, the electronic device 101 may control the switching circuit based on the result of determination. For example, as shown in FIG. 19, the electronic device 101 may include a first load 1911, a second load 1912, and a third load 1913 to an nth load 1914. For example, a first load 1911 may be a radar, a second load 1912 may be a camera, and a third load 1913 may be a sensor; however, this is only a non-limiting example. The electronic device 101 may include a first regulator 1901, a second regulator 1902, a third regulator 1903, and a fourth regulator 1904 to an mth regulator 1905. At least some of the first regulator 1901, the second regulator 1902, the third regulator 1903, and the fourth regulator 1904 to the mth regulator 1905 may be at least some of the above-described regulators 132*a*, 132*b*, and 132*c* to 132*m*, but are not limited thereto. At least some of the plurality of loads 1911, 1912, 1913, and 1914 may be at least some of the above-described loads 140*a*, 140*b*, and 140*c* to 140*n* of FIG. 1 but are not limited thereto. During a first period, the electronic device 101 may control the switching circuit to connect the first regulator 1901 to the first load 1911 and the second regulator 1902 to connect to the third load 1913. For example, the first load 1911 and the third load 1913 each may be in the idle mode. During a second period, the electronic device 101 may determine to operate the first load 1911 and the third load 1913 in the active mode. Thus, the electronic device 101 may determine to merge the regulators to operate under an operation condition meeting a designated condition. Merging regulators may mean that a plurality of regulators is connected to any one load. Thus, during the second period, the electronic device 101 may control the switching circuit to connect the first regulator 1901 and the second regulator 1902 to the first load 1911 and the third regulator 1903 and the fourth regulator 1904 to connect to the third load 1913. The electronic device 101 may identify per-regulator power conversion efficiency by measuring the current and/or voltage at the input terminal and output terminal of the regulator and perform adjustment of the control parameter of the regulator and/or reselection of a regulator depending on the power conversion efficiency.

According to an embodiment, the electronic device 101 may perform regulator reselection and reconnection of a reselected regulator before or after the mode of load is changed. Even when the operating load is changed, the electronic device 101 may perform regulator reselection and reconnection of the reselected regulator before the changed load operates, but is not limited to a specific time in doing so.

Figure 20:
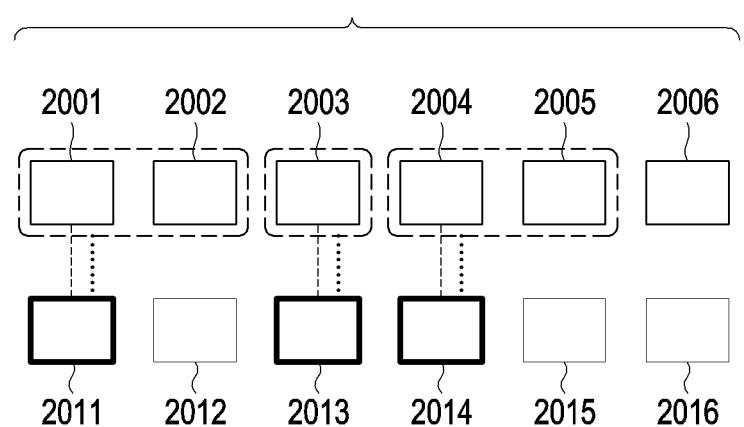
FIG. 20 is a view illustrating an example of splitting regulators according to an embodiment.

FIG. 20 is a view illustrating an example of splitting regulators according to an embodiment. FIG. 20 may illustrate an example of selecting at least one regulator and controlling the switching circuit in, e.g., operations 203, 205, and 207 of FIG. 2.

According to an embodiment, an electronic device 101 may include a first regulator 2001, a second regulator 2002, a third regulator 2003, a fourth regulator 2004, a fifth regulator 2005, and a sixth regulator 2006, and a first load 2011, a second load 2012, a third load 2013, a fourth load 2014, a fifth load 2015, and a sixth load 2016. At least some of the first regulator 2001, the second regulator 2002, the third regulator 2003, the fourth regulator 2004, the fifth regulator 2005, and the sixth regulator 2006 may be at least some of the above-described regulators 132a, 132b, and 132c to 132m, but are not limited thereto. At least some of the first load 2011, the second load 2012, the third load 2013, the fourth load 2014, the fifth load 2015, and the sixth load 2016 may be at least some of the above-described loads 140a, 140b, and 140c to 140n, but are not limited thereto.

According to an embodiment, during a first period, the electronic device 101 may control the switching circuit to connect the first regulator 2001 and the second regulator 2002 to the first load 2011, the third regulator 2003 to connect to the second load 2012, and the fourth regulator 2004 and the fifth regulator 2005 to connect to the fourth load 2014. The sixth regulator 2006 may be turned off, and the second load 2012, the fifth load 2015, and the sixth load 2016 may be turned off. During a second period, the electronic device 101 may determine to change the mode of the first load 2011, the third load 2013, and the fourth load 2014. According to the changed mode, the electronic device 101 may determine to split the first regulator 2001 and the second regulator 2002 and split the fourth regulator 2004 and the fifth regulator 2005 during the second period. The electronic device 101 may control the switching circuit to connect the first regulator 2001 to the first load 2011, the third regulator 2003 to connect to the third load 2013, and the fourth load 2004 to connect to the fourth load 2014 during the second period. The electronic device 101 may turn off the second regulator 2002 and the fifth regulator 2005 which used to be in connection.

Figure 21:
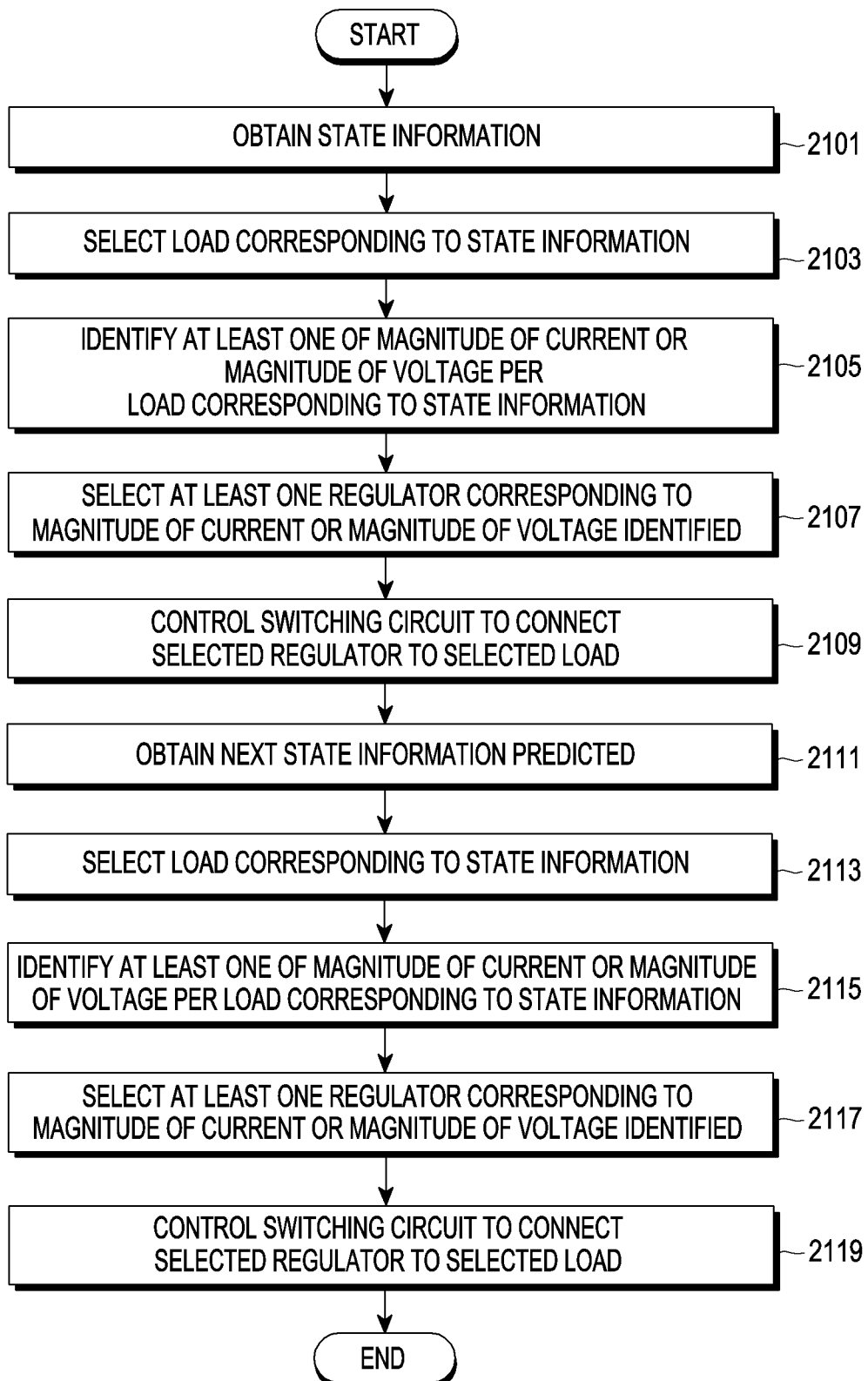
FIG. 21 is a flowchart illustrating a method for operating an electronic device according to an embodiment.

FIG. 21 is a flowchart illustrating a method for operating an electronic device according to an embodiment. The operations of FIG. 21 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 and/or the MCU 131) may obtain state information in operation 2101. In operation 2103, the electronic device 101 may select the load corresponding to the state information. In operation 2105, the electronic device 101 may identify at least one of the magnitude of current or magnitude of voltage per load corresponding to the state information. In operation 2107, the electronic device 101 may select at least one regulator corresponding to the identified magnitude of current or magnitude of voltage. In operation 2109, the electronic device 101 may control the switching circuit so that the selected regulator connects to the selected load.

According to an embodiment, the electronic device 101 may obtain next state information predicted in operation 2111. The electronic device 101 may obtain the next state information before actually performing an operation and, in operation 2113, the electronic device 101 may select the load corresponding to the state information. In operation 2115, the electronic device 101 may identify at least one of the magnitude of current or magnitude of voltage per load corresponding to the state information. In operation 2117, the electronic device 101 may select at least one regulator corresponding to the identified magnitude of current or magnitude of voltage. The electronic device 101 may keep on controlling the switching circuit corresponding to the current state information until the next state information is executed. The electronic device 101 may control the switching circuit to connect the selected regulator to the selected load in operation 2119 at the time corresponding to execution of the next state information.

Figure 22:
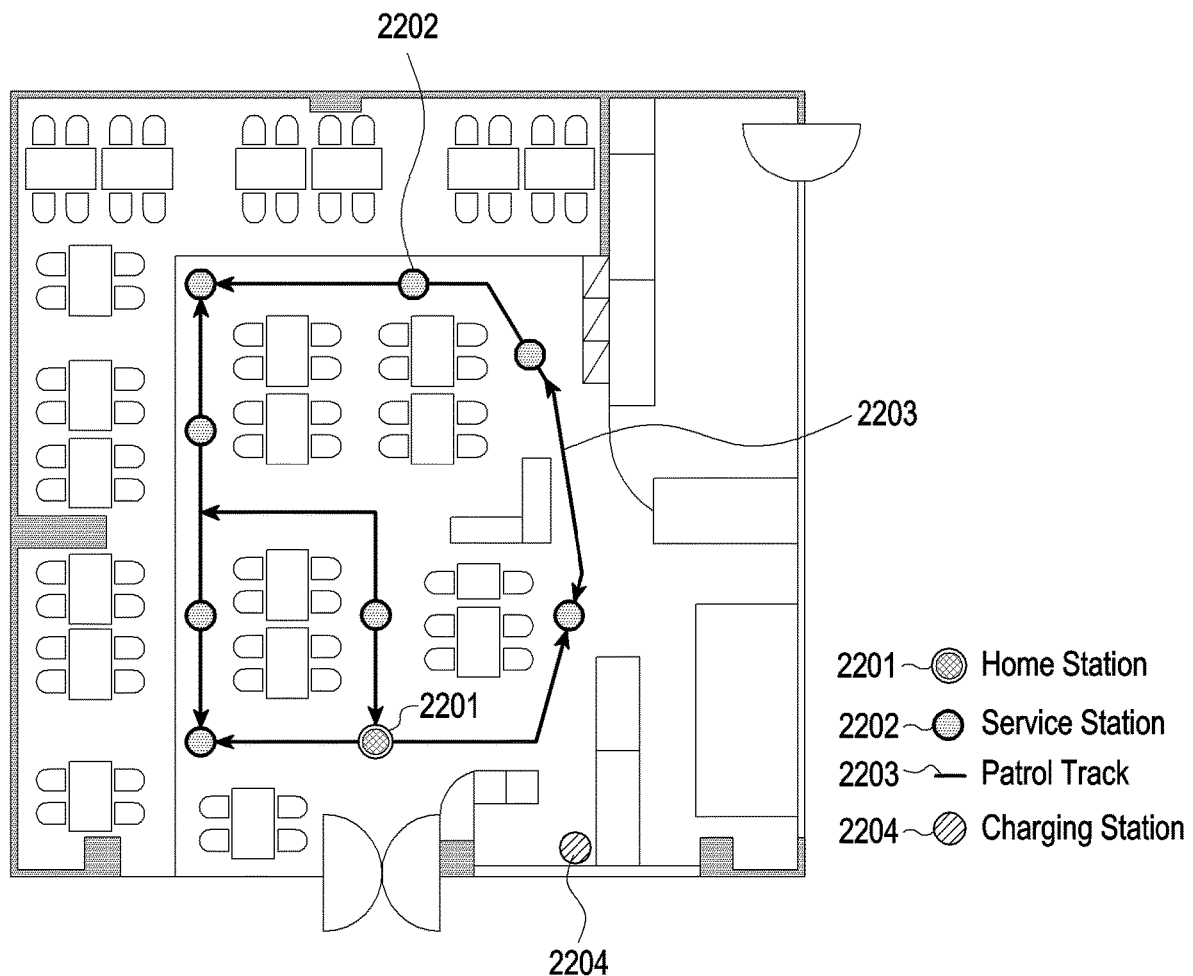
FIG. 22 is a plan view illustrating a moving path of an electronic device according to an embodiment.

FIG. 22 is a plan view illustrating a moving path of an electronic device according to an embodiment.

The plan view of FIG. 22 may be one for, e.g., a restaurant environment. The electronic device 101 may store information for the plan view and store information for at least one point on the plan view. For example, the electronic device 101 may store information for the position of a home station 2201 and information for a charging station 2204. The electronic device 101 may identify the positions of one or more service stations 2202 which are points where a service is to be executed based on the obtained information and identify a moving path 2203 corresponding thereto. The electronic device 101 may select a regulator corresponding to the moving state while moving along the moving path 2203. The electronic device 101 may select a regulator based on the state information corresponding to the service which is to be performed by each service station 2202.

Figure 23:
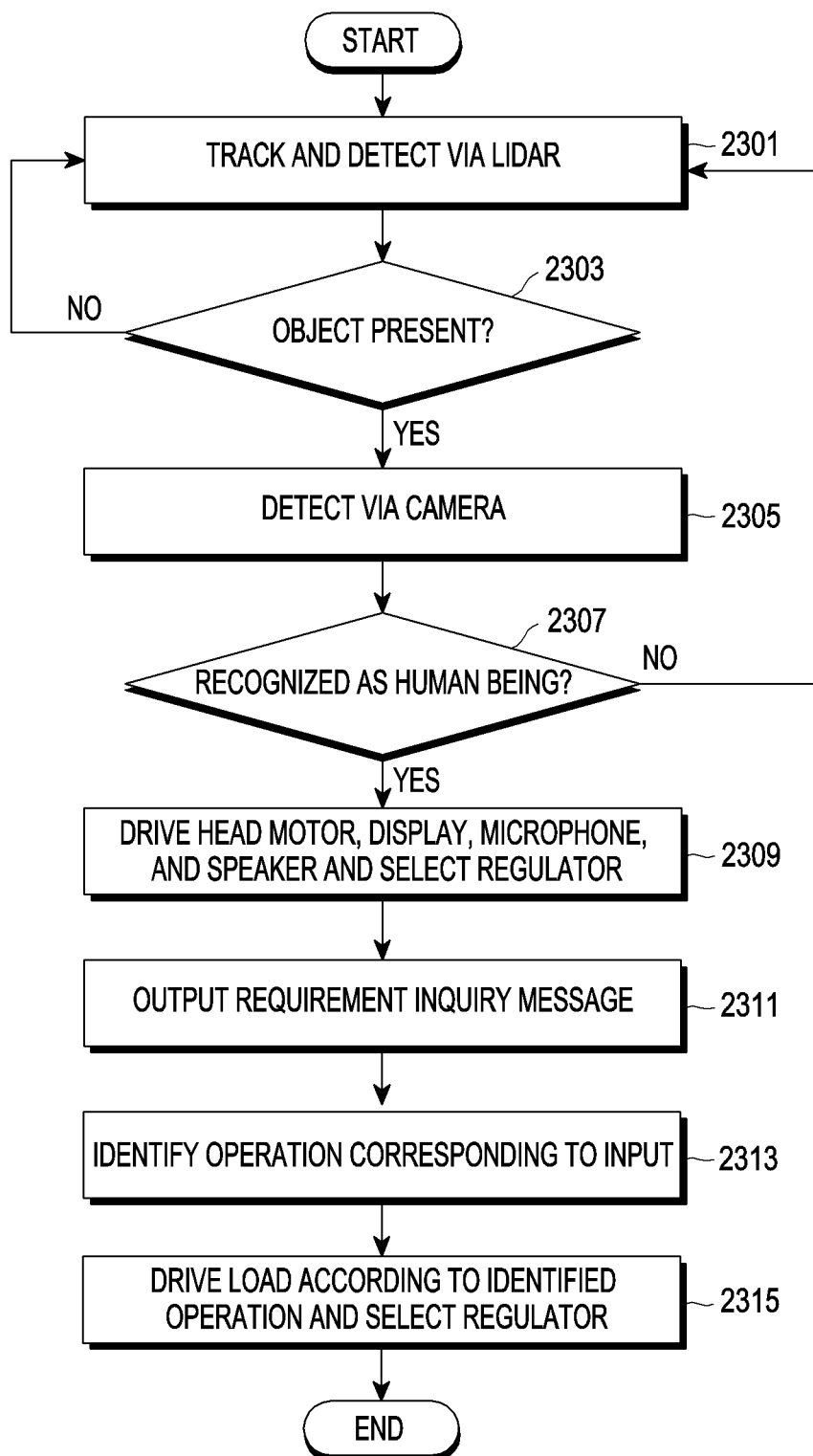
FIG. 23 is a flowchart illustrating a method for operating an electronic device according to an embodiment.

FIG. 23 is a flowchart illustrating a method for operating an electronic device according to an embodiment of the disclosure. The operations of FIG. 23 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 and/or the MCU 131) may perform tracking and detection via a lidar in operation 2301. The electronic device 101 may select a regulator for providing power to the lidar which meets a designated power conversion efficiency condition. The electronic device 101 may control the selected regulator to provide power to the lidar. In operation 2303, the electronic device 101 may identify whether there is an object according to the detection operation. When no object is identified to be present (no in operation 2303), the electronic device 101 may perform tracking and detection. When an object is identified to be present (yes in operation 2303), the electronic device 101 may perform detection via a camera in operation 2305. The electronic device 101 may select a regulator for providing power to the camera which meets a designated power conversion efficiency condition. The electronic device 101 may control the selected regulator to provide power to the camera. In operation 2307, the electronic device 101 may identify whether a human being is recognized based on the result of detection. When no human being is recognized (no in operation 2307), the electronic device 101 may perform tracking and detection via a lidar. When a human being is recognized (yes in operation 2307), the electronic device 101 may drive the head motor, display, microphone, and speaker and select the regulator corresponding thereto in operation 2309. In operation 2311, the electronic device 101 may output a requirement inquiry message. In operation 2313, the electronic device 101 may identify the operation corresponding to an input. For example, the electronic device 101 may output various kinds of greeting messages (e.g., Thank you for visiting, Could I introduce our restaurant, good-day, see you again). The electronic device 101 may receive the user's response corresponding thereto, e.g., a food order. The electronic device 101 may perform an operation corresponding thereto, e.g., transmission of the received food order via communication and output of a response voice (e.g., a voice output for waiting time). In operation 2315, the electronic device 101 may perform load driving and regulator selection according to the identified operation.

Figure 24:
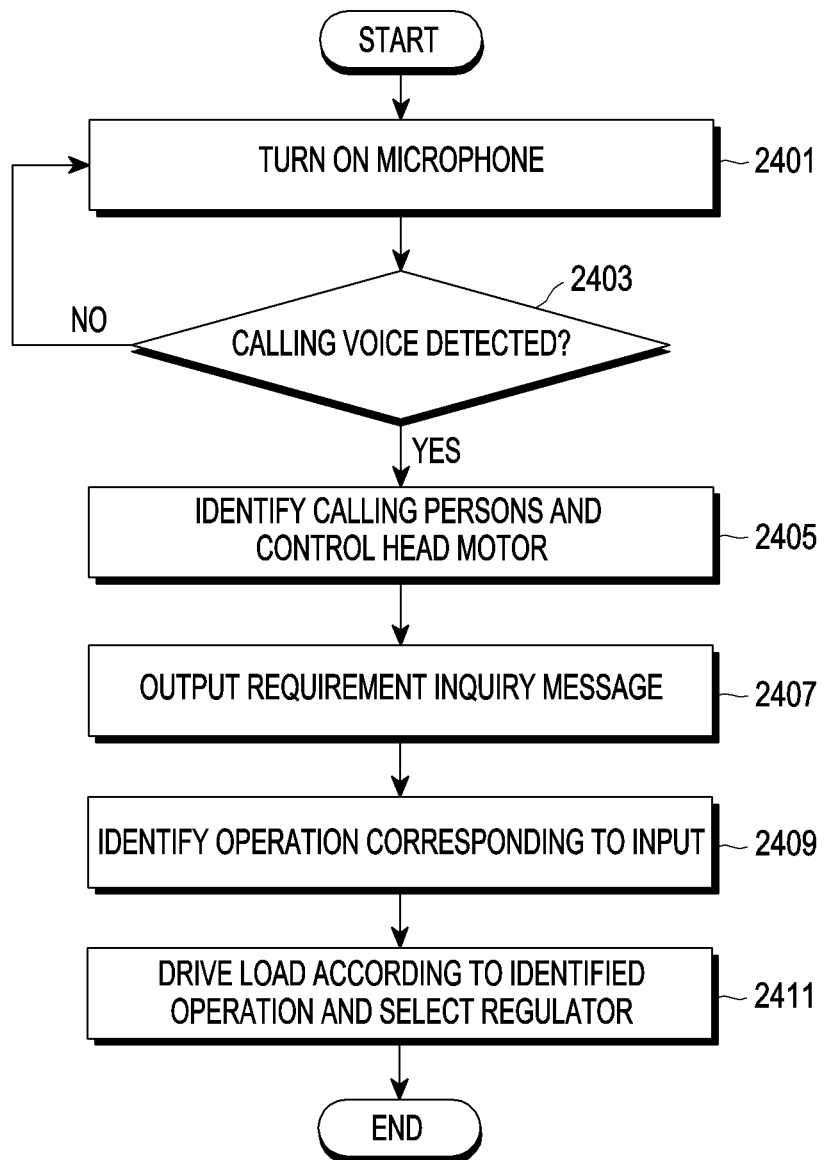
FIG. 24 is a flowchart illustrating a method for operating an electronic device according to an embodiment.

FIG. 24 is a flowchart illustrating a method for operating an electronic device according to an embodiment. The operations of FIG. 24 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 and/or the MCU 131) may turn on the microphone in operation 2401. The electronic device 101 may select a regulator for providing power to the microphone which meets a designated power conversion efficiency condition. The electronic device 101 may control the selected regulator to provide power to the microphone. In operation 2403, the electronic device 101 may identify whether a calling voice is detected. When no calling voice is detected (no in operation 2403), the electronic device 101 may continuously monitor whether a calling voice is detected. When a calling voice is detected (yes in operation 2403), the electronic device 101 may identify calling persons and control the head motor in operation 2405. For example, the electronic device 101 may identify the direction in which the calling voice is detected and control the head motor to be oriented in the detected direction. In operation 2407, the electronic device 101 may output a requirement inquiry message. In operation 2409, the electronic device 101 may identify the operation corresponding to an input. In operation 2411, the electronic device 101 may perform load driving and regulator selection according to the identified operation.

Figure 25:
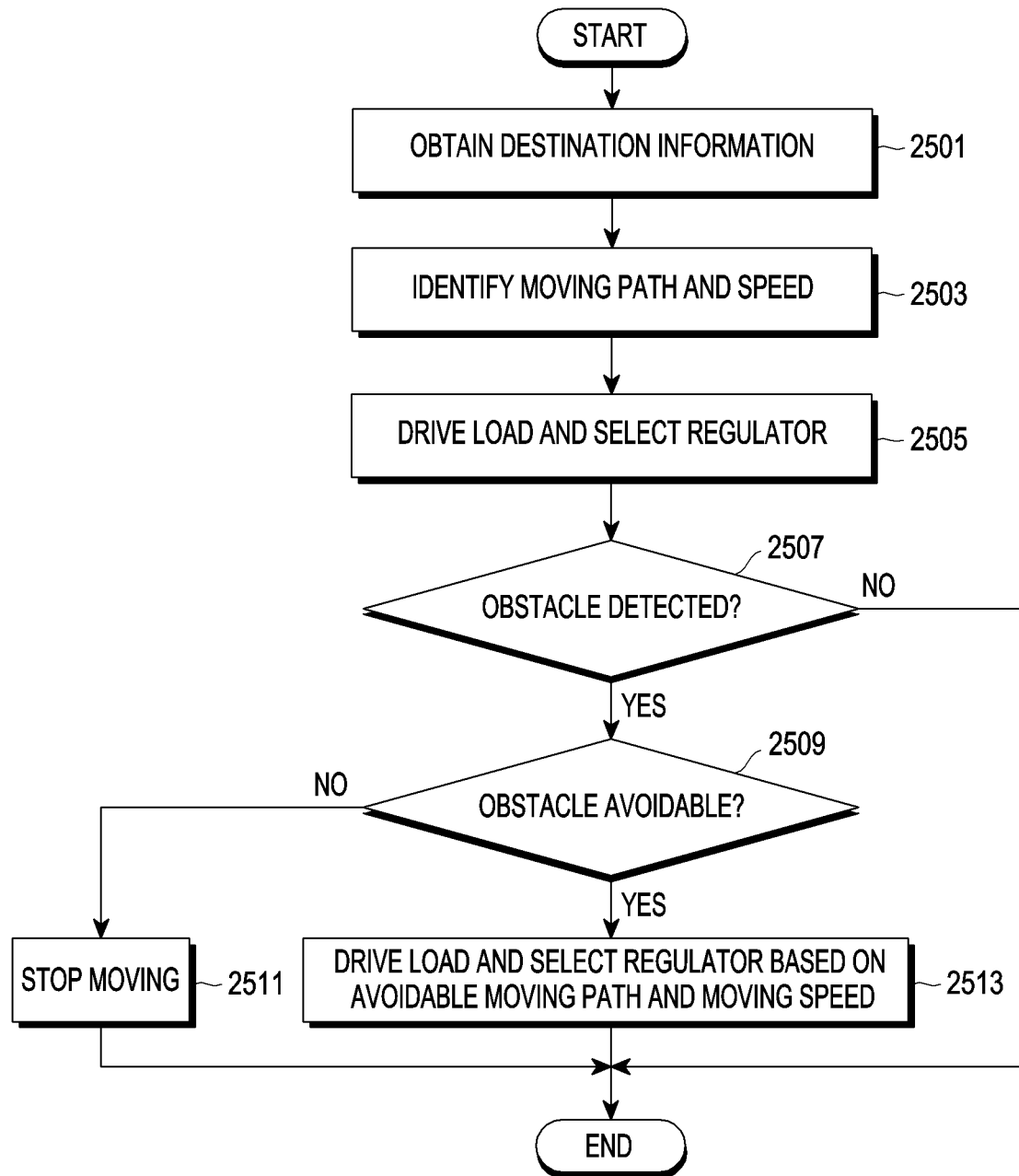
FIG. 25 is a flowchart illustrating a method for operating an electronic device according to an embodiment.

FIG. 25 is a flowchart illustrating a method for operating an electronic device according to an embodiment of the disclosure. The operations of FIG. 25 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 and/or the MCU 131) may obtain destination-associated information in operation 2501. For example, upon detecting an event (e.g., table clearing) to be performed at a specific point, the electronic device 101 may identify the destination-associated information (e.g., position-associated information). In operation 2503, the electronic device 101 may identify the moving path and the moving speed. For example, the electronic device 101 may identify the moving speed in an m/s unit or select any one of a plurality of ranges. In an environment with many obstacles, the electronic device 101 may be configured to move relatively at low speed. In operation 2505, the electronic device 101 may drive the load and select a regulator based on the identified moving path and moving speed. The electronic device 101 may operate the load by connecting the selected regulator to the load and driving the regulator. For example, the electronic device 101 may be moved by operating the driving circuit. In operation 2507, the electronic device 101 may identify whether an obstacle is detected while moving. The electronic device 101 may identify whether an obstacle is detected based on at least one of an image obtained by the camera or sensing data obtained by the proximity sensor. When an obstacle is detected (yes in operation 2507), the electronic device 101 may identify whether the obstacle is avoidable in operation 2509. The electronic device 101 may identify whether the obstacle is avoidable depending on whether there is another moving path. When the obstacle is identified to be unavoidable (no in operation 2509), the electronic device 101 may stop moving in operation 2511. For example, the electronic device 101 may control the brake circuit to stop moving and control the regulator to provide power to the load. For directly controlling the brake circuit, the electronic device 101 may control the brake circuit to be in the idle mode. When the obstacle is identified to be avoidable (yes in operation 2509), the electronic device 101 may drive the load and select a regulator based on the avoidable moving path and moving speed in operation 2513.

Figure 26:
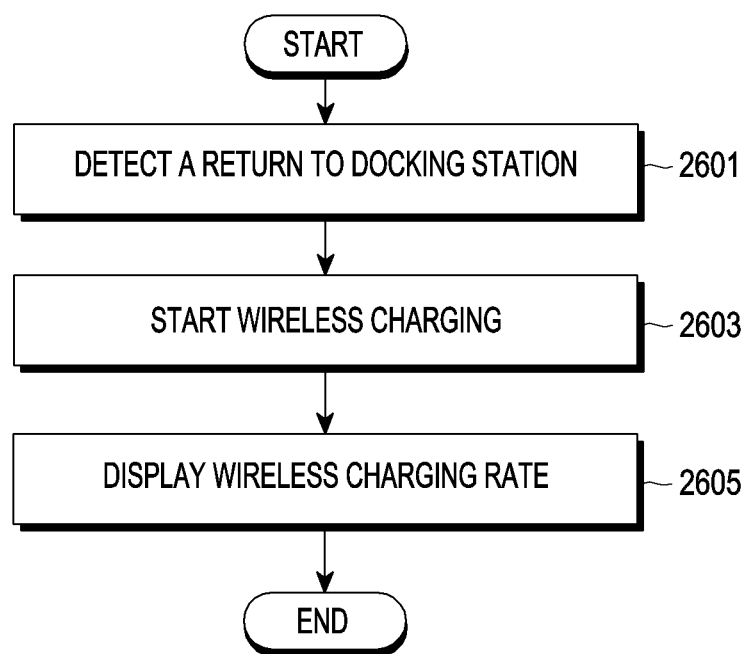
FIG. 26 is a flowchart illustrating a method for operating an electronic device according to an embodiment.

FIG. 26 is a flowchart illustrating a method for operating an electronic device according to an embodiment. The operations of FIG. 26 may be performed by the processor 120 alone, which is positioned outside the power management circuit 130, or the MCU 131 alone, which is positioned in the power management circuit 130 or may be performed by the MCU 131 in the power management circuit 130 and the processor 120.

According to an embodiment, the electronic device 101 (e.g., at least one of the processor 120 and/or the MCU 131) may detect a return to the docking station in operation 2601. For example, the electronic device 101 may detect the return by detecting the docking station. For example, the electronic device 101 may detect the return by detecting sensing data that indicates entrance to the docking station. For example, the electronic device 101 may detect the docking station by detecting the wireless charging module included in the docking station. Upon detecting the return to the docking station, the electronic device 101 may start wireless charging in operation 2603. In operation 2605, the electronic device 101 may display the wireless charging rate. Upon wireless charging, the electronic device 101 may operate the display for displaying the wireless charging rate and select and operation the regulator corresponding thereto. Or, upon detecting the return to the docking station, the electronic device 101 may receive power in a wired manner.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As apparent from the foregoing description, according to embodiments, there may be provided an electronic device with a switching circuit capable of selectively connecting at least one of a plurality of regulators to at least one of a plurality of loads. The electronic device and method of operating the electronic device may selectively connect each regulator and each load so that the regulator driven may be operated under the optimal operation condition. Thus, the regulator may operate in its optimal efficiency.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:
1. An electronic device, comprising:
a plurality of loads;
a plurality of regulators configured to adjust power provided from a power source and output the adjusted power, the plurality of regulators comprising a first regulator and a second regulator;

a switching circuit configured to selectively connect the plurality of regulators to at least one of the plurality of loads; and at least one processor configured to:
identify a load to which the adjusted power is to be supplied among the plurality of loads,
identify a magnitude of a current required by the identified load,
obtain a first value of a power conversion efficiency of the first regulator for supplying the current with the magnitude to the identified load and a second value of a power conversion efficiency of the second regulator for supplying the current with the magnitude to the identified load,
based on the first value and the second value, select at least one regulator from among the first regulator and the second regulator for supplying the current with the magnitude to the identified load, wherein the power conversion efficiency of the selected at least one regulator is greater than or equal to a predetermined value, and
control the switching circuit to connect the at least one regulator to the identified load.

2. The electronic device of claim 1, wherein the at least one processor is further configured to control the at least one regulator to provide the adjusted power to the identified load.

3. The electronic device of claim 1, wherein the at least one processor is further configured to:
identify a magnitude of a voltage required by the identified load, and
select the at least one regulator further based on the magnitude of the voltage.

4. The electronic device of claim 1, further comprising a plurality of resistance circuits,
wherein the plurality of regulators comprises output terminals, respectively,
wherein each of the plurality of resistance circuits is connected to a respective output terminal of the plurality of regulators, respectively, and
wherein the at least one processor is further configured to control at least one resistance circuit among the plurality of resistance circuits to be connected to the at least one regulator based on a magnitude of voltage required by the identified load.

5. The electronic device of claim 1, wherein each of the plurality of regulators is further configured to programmably adjust its output voltage,
wherein the at least one processor is further configured to output a control signal for adjusting a voltage of the at least one regulator based on a magnitude of voltage required by the identified load, and
the at least one regulator is configured to adjust its output voltage based on the control signal.

6. The electronic device of claim 1, further comprising:
a plurality of first sensors, each of the plurality of first sensors being configured to sense a magnitude of at least one of a current or a voltage at an input terminal of the plurality of regulators, respectively; and
a plurality of second sensors, each of the plurality of second sensors being configured to sense a magnitude of at least one of a current or a voltage at an output terminal of the plurality of regulators, respectively,
wherein the at least one processor is further configured to calculate an output power conversion efficiency of the at least one regulator based on sensing data from at least one first sensor among the plurality of first sensors and at least one second sensor among the plurality of second sensors that correspond to the at least one regulator, while controlling the at least one regulator to provide the adjusted power to the identified load.

7. The electronic device of claim 6, wherein, upon identifying that the calculated output power conversion efficiency is less than the predetermined value, the at least one processor is further configured to:
identify at least one other regulator among the plurality of regulators that is different from the at least one regulator,
control the switching circuit to connect the at least one other regulator to the identified load, and
control the at least one other regulator to provide the power adjusted by the at least one other regulator, to the identified load.

8. The electronic device of claim 1, wherein the at least one processor is further configured to:
after controlling the at least one regulator to provide the adjusted power to the identified load, identify at least one other load as a load to which the power is to be supplied, among the plurality of loads,
identify at least one other regulator among the plurality of regulators that is different from the at least one regulator based on the at least one other load,
control the switching circuit to connect the at least one other regulator to the at least one other load, and
control the at least one other regulator to provide the power adjusted by the at least one other regulator, to the at least one other load.

9. The electronic device of claim 1, wherein the at least one processor is further configured to:
after controlling the at least one regulator to provide the adjusted power to the identified load, identify a change in at least one of the magnitude of the current or a magnitude of a voltage required by the identified load,
identify at least one other regulator among the plurality of regulators that is different from the at least one regulator, based on the changed magnitude of the at least one of the current or the voltage,
control the switching circuit to connect the at least one other regulator to the identified load, and
control the at least one other regulator to provide the power having the changed magnitude of the at least one of the current or the voltage, to the identified load.

10. The electronic device of claim 1, wherein the at least one processor is further configured to identify the load using state information for the electronic device, the state information being related to at least one operation of the electronic device.

11. The electronic device of claim 1, wherein the at least one processor is further configured to:
store, for each of the first regulator and the second regulator, information on a range of values of output currents, respectively,
wherein the range of values of output currents corresponds to values of the power conversion efficiency of each of the first regulator and the second regulator that are greater than or equal to the predetermined value.

12. A power management circuit configured to transfer power to at least one of a plurality of external loads, the power management circuit comprising:
a plurality of regulators configured to adjust power provided from a power source and output the adjusted power, the plurality of regulators comprising a first regulator and a second regulator;

a switching circuit configured to selectively connect the plurality of regulators to at least one of the plurality of external loads; and a micro-controlling unit (MCU) configured to:
- identify a load to which the adjusted power is to be supplied among the plurality of external loads,
- identify a magnitude of a current required by the identified load,
- obtain a first value of a power conversion efficiency of the first regulator for supplying the current with the magnitude to the identified load and a second value of a power conversion efficiency of the second regulator for supplying the current with the magnitude to the identified load,
- based on the first value and the second value, select at least one regulator from among the first regulator and the second regulator for supplying the current with the magnitude to the identified load, wherein the power conversion efficiency of the selected at least one regulator is greater than equal to a predetermined value, and
- control the switching circuit to connect the at least one regulator to the identified load.

13. The power management circuit of claim 12, wherein the MCU is further configured to control the at least one regulator to provide the adjusted power to the identified load.

14. The power management circuit of claim 12, wherein the MCU is further configured to:
- identify a magnitude of a voltage required by the identified load, and
- select the at least one regulator further based on the magnitude of the voltage.

15. The power management circuit of claim 12, further comprising a plurality of resistance circuits,
- wherein the plurality of regulators comprises output terminals, respectively,
- wherein each of the plurality of resistance circuits is connected to a respective output terminal of the output terminals, respectively, and
- wherein the MCU is further configured to control at least one resistance circuit among the plurality of resistance circuits to be connected to the at least one regulator based on a magnitude of voltage required by the identified load.

16. The power management circuit of claim 12, further comprising:

a plurality of first sensors, each of the plurality of first sensors being configured to sense a magnitude of at least one of a current or a voltage at an input terminal of the plurality of regulators, respectively; and a plurality of second sensors, each of the plurality of second sensors being configured to sense a magnitude of at least one of a current or a voltage at an output terminal of the plurality of regulators, respectively, wherein the MCU is further configured to:
- calculate an output power conversion efficiency of the at least one regulator based on sensing data from at least one first sensor among the plurality of first sensors and at least one second sensor among the plurality of second sensors that correspond to the at least one regulator, while controlling the at least one regulator to provide the adjusted power to the identified load,
- determine that the calculated output power conversion efficiency is less than the predetermined value of the power conversion efficiency, and
- identify another regulator among the plurality of regulators to be connected to the identified load based on the determining.

17. The power management circuit of claim 12, wherein the MCU is further configured to:
- after controlling the at least one regulator to provide the adjusted power to the identified load, identify a change in at least one of the magnitude of the current or a magnitude of a voltage required by the identified load,
- identify at least one other regulator among the plurality of regulators that is different from the at least one regulator, based on the changed magnitude of the at least one of the current or the voltage,
- control the switching circuit to connect the at least one other regulator to the identified load, and
- control the at least one other regulator to provide the power having the changed magnitude of the at least one of the current or the voltage, to the identified load.

18. The power management circuit of claim 12, wherein the MCU is further configured to:
- receive state information for an electronic device from a processor of the electronic device, and
- identify the load based on the received state information,
- wherein the processor of the electronic device is provided outside the power management circuit, and
- wherein the state information is related to at least one operation of the electronic device.

* * * * *